(12) United States Patent
Takiyama et al.

(10) Patent No.: US 7,680,358 B2
(45) Date of Patent: Mar. 16, 2010

(54) IMAGE PROCESSING APPARATUS AND CONTROL METHOD THEREOF, AND PROGRAM

(75) Inventors: Yasuhiro Takiyama, Kanagawa-ken (JP); Ken Achiwa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/757,728

(22) Filed: Jun. 4, 2007

(65) Prior Publication Data

US 2007/0279705 A1    Dec. 6, 2007

(30) Foreign Application Priority Data

Jun. 5, 2006    (JP)    .............. 2006-156647

(51) Int. Cl.
*G06K 9/20*    (2006.01)
(52) U.S. Cl. .................. 382/282; 382/284; 382/293; 382/294; 358/1.1; 358/453
(58) Field of Classification Search ................. 382/282, 382/284, 293, 294; 358/1.1, 453
See application file for complete search history.

(56) References Cited

U.S. PATENT DOCUMENTS

| | | | | |
|---|---|---|---|---|
| 5,506,941 A | * | 4/1996 | Kurumida | 358/1.11 |
| 5,796,411 A | * | 8/1998 | Cyman et al. | 345/502 |
| 5,889,596 A | | 3/1999 | Yaguchi et al. | 358/448 |
| 6,094,510 A | | 7/2000 | Yaguchi et al. | 382/232 |
| 6,137,589 A | * | 10/2000 | Obrador et al. | 358/1.16 |
| 7,130,072 B2 | | 10/2006 | Suzuki et al. | 358/1.15 |
| 2005/0105148 A1 | | 5/2005 | Misawa | 358/537 |

FOREIGN PATENT DOCUMENTS

| | | |
|---|---|---|
| JP | 2004-120639 | 4/2004 |
| JP | 2005-105148 | 4/2005 |
| JP | 2005-149096 | 6/2005 |

* cited by examiner

*Primary Examiner*—Tom Y Lu
(74) *Attorney, Agent, or Firm*—Fitzpatrick, Cella, Harper & Scinto

(57) ABSTRACT

When the data is divided into blocks each having a set block size, and image data includes an object which extends over a plurality of blocks, the object is divided based on object information associated with the object. The object information of the divided object is re-set based on the object information associated with the object divided into blocks. Block vector image data are generated using the object having the re-set object information.

14 Claims, 22 Drawing Sheets

FIG. 7

C1 : DocumentSetStart
C2 : DocumentSize (A4)
C3 : DocumentDirection (PORT)
C4 : DocumentType (Page)
C5 : DocumentSetEnd
} 901

C6 : PageStart
C7 : Font {1}
C8 : FontSize {10}
C9 : FontColor {0, 0, 0}
C10 : Position {10, 5}
C11 : String {XXXX···YY···}
} 902

C12 : FillColor {128, 64, 35}
C13 : LineColor {255, 92, 128}
C14 : Position {40, 300}
C15 : ArcRadius {10}
C16 : CloseArc {0, 90}
C17 : FillColor {62, 35, 200}
C18 : LineColor {10, 40, 80}
C19 : Position {40, 300}
C20 : ArcRadius {10}
C21 : CloseArc {90, 360}
C22 : PageEnd
} 903

OBJECT 2202

COORDINATE
INFORMATION : START POINT
(x1, y1)
→TERMINAL
POINT
(X1, Y1)
PATTERN : SOLID LINE
COLOR : BLACK
LINE WIDTH : 28 pt

OBJECT 2205

COORDINATE
INFORMATION : START POINT
(a1, b1)
→TERMINAL
POINT
(A1, B1)
PATTERN : SOLID LINE
COLOR : BLACK
LINE WIDTH : 28 pt

OBJECT 2206

COORDINATE
INFORMATION : START POINT
(a2, b2)
→TERMINAL
POINT
(A2, B2)
PATTERN : SOLID LINE
COLOR : BLACK
LINE WIDTH : 28 pt

FIG. 13

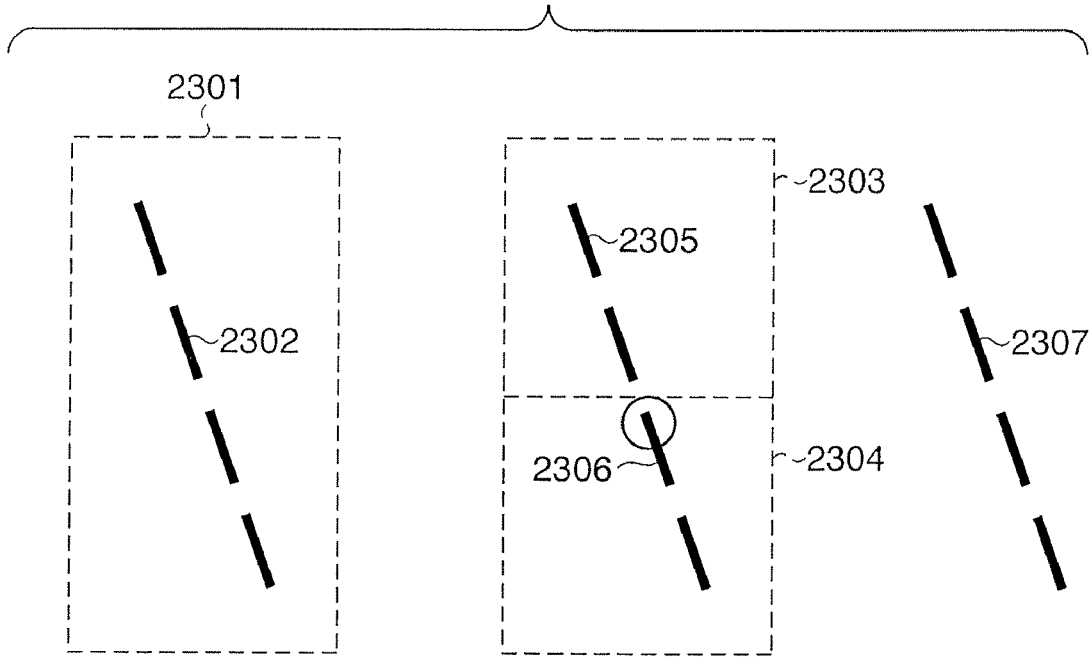

OBJECT 2302

COORDINATE
INFORMATION : START POINT
(x1, y1)
→TERMINAL
POINT
(X1, Y1)
ATTRIBUTE
INFORMATION : OFFSET VALUE 0
LINE SEGMENT 3
SPACE 1

OBJECT 2305

COORDINATE
INFORMATION : START POINT
(a1, b1)
→TERMINAL
POINT
(A1, B1)
ATTRIBUTE
INFORMATION : OFFSET VALUE 0
LINE SEGMENT 3
SPACE 1

OBJECT 2306

COORDINATE
INFORMATION : START POINT
(a2, b2)
→TERMINAL
POINT
(A2, B2)
ATTRIBUTE
INFORMATION : OFFSET VALUE 1
LINE SEGMENT 3
SPACE 1

FIG. 14
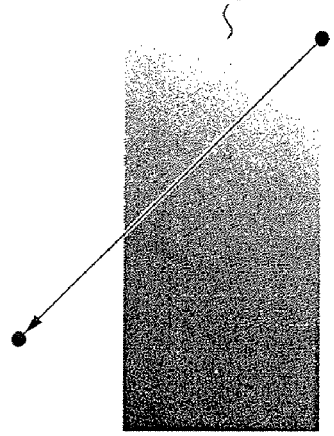
OBJECT 2401
COLOR SPACE : RGB
　　　　　　　START POINT
　　　　　　　　(x1, y1)
　　　　　　　→TERMINAL
　　　　　　　　POINT
　　　　　　　　(X1, Y1)
　START POINT
　　　COLOR : 0xffffff
TERMINAL POINT
　　　COLOR : 0xff7f7f
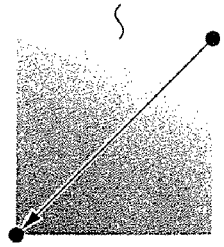
OBJECT 2402
COLOR SPACE : RGB
　　　　　　　START POINT
　　　　　　　　(a1, b1)
　　　　　　　→TERMINAL
　　　　　　　　POINT
　　　　　　　　(A1, B1)
　START POINT
　　　COLOR : 0xffffff
TERMINAL POINT
　　　COLOR : 0xffa9a9
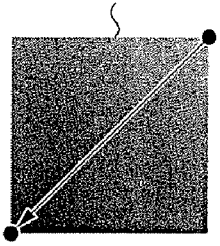
OBJECT 2403
COLOR SPACE : RGB
　　　　　　　START POINT
　　　　　　　　(a2, b2)
　　　　　　　→TERMINAL
　　　　　　　　POINT
　　　　　　　　(A2, B2)
　START POINT
　　　COLOR : 0xffd4d4
TERMINAL POINT
　　　COLOR : 0xff7f7f

FIG. 17
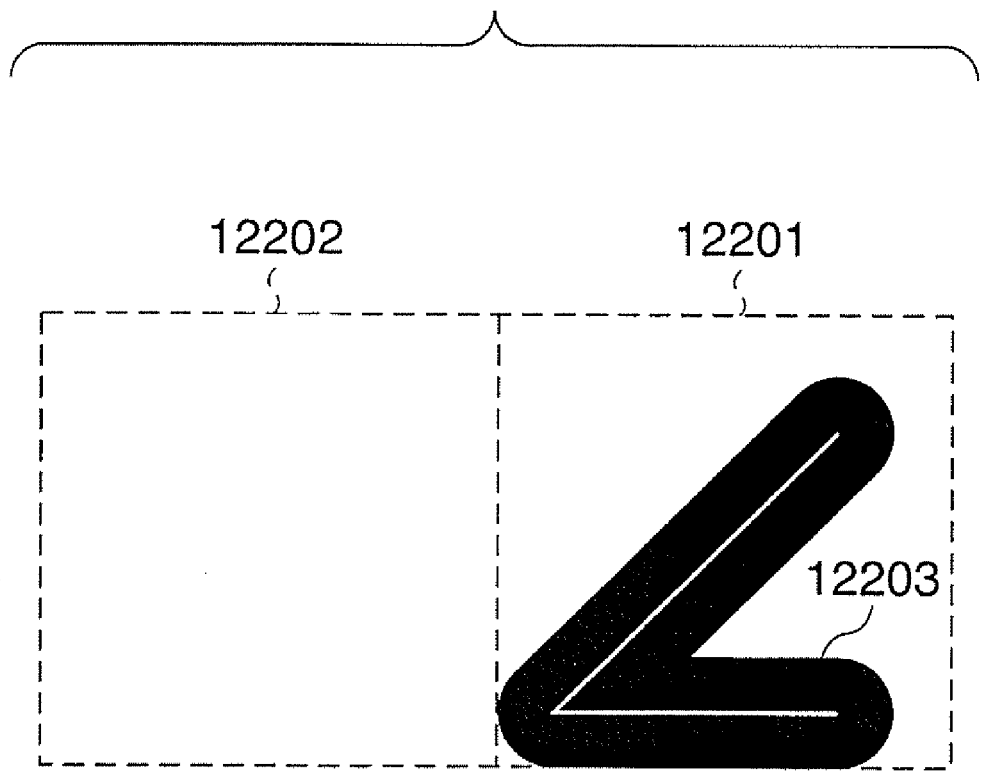
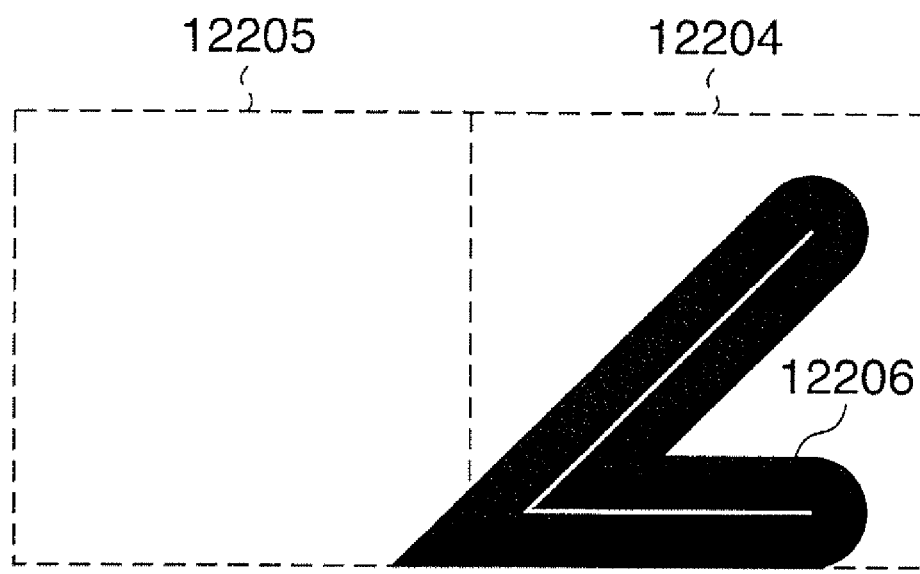

FIG. 18
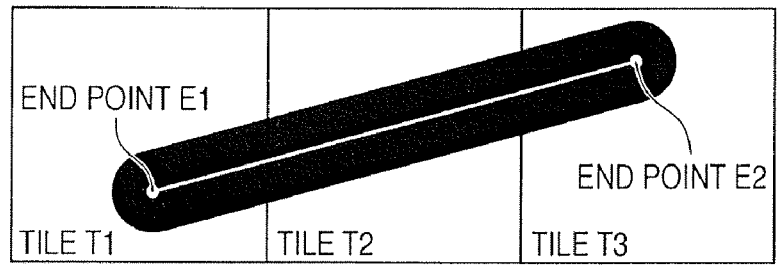
OUTLINE : START POINT
(x1, y1)
→TERMINAL
POINT
(X1, Y1)
PATTERN : SOLID LINE
COLOR : BLACK
LINE WIDTH : 42 pt
END POINT : ROUND CAP
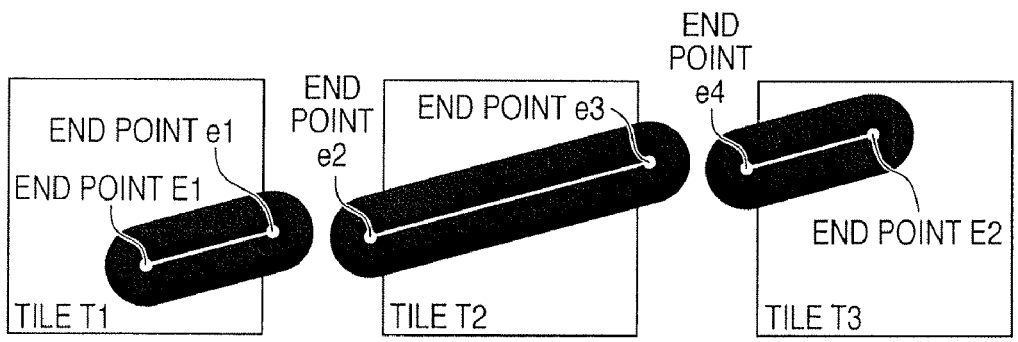
OUTLINE : START POINT　　　START POINT　　　START POINT
(a1, b1)　　　　　　(a2, b2)　　　　　　(a3, b3)
→TERMINAL　　　　→TERMINAL　　　　→TERMINAL
POINT　　　　　　　POINT　　　　　　　POINT
(A1, B1)　　　　　　(A2, B2)　　　　　　(A3, B3)
PATTERN : SOLID LINE　　SOLID LINE　　　　SOLID LINE
COLOR : BLACK　　　　　BLACK　　　　　　BLACK
LINE WIDTH : 42 pt　　　　42 pt　　　　　　42 pt
END POINT : ROUND CAP　ROUND CAP　　　ROUND CAP

FIG. 19

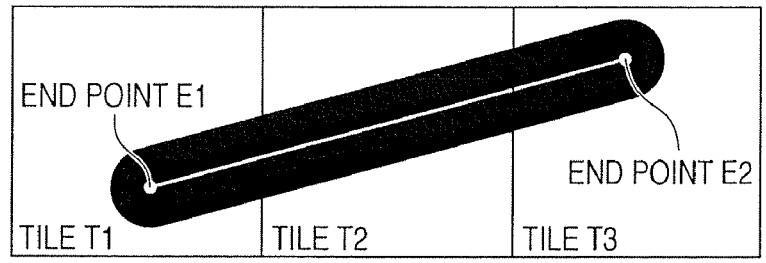

OUTLINE : START POINT
(x1, y1)
→TERMINAL
POINT
(X1, Y1)
PATTERN : SOLID LINE
COLOR : BLACK
LINE WIDTH : 42 pt
END POINT : ROUND CAP

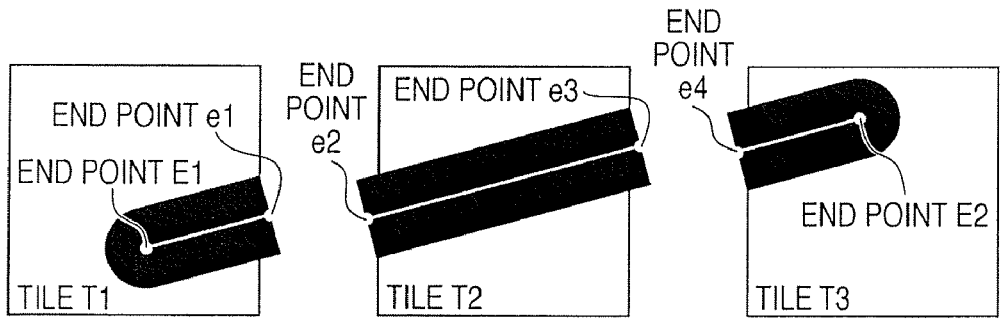

| OUTLINE : | START POINT<br>(a1, b1)<br>→TERMINAL<br>POINT<br>(A1, B1) | START POINT<br>(a2, b2)<br>→TERMINAL<br>POINT<br>(A2, B2) | START POINT<br>(a3, b3)<br>→TERMINAL<br>POINT<br>(A3, B3) |
|---|---|---|---|
| PATTERN : | SOLID LINE | SOLID LINE | SOLID LINE |
| COLOR : | BLACK | BLACK | BLACK |
| LINE WIDTH : | 42 pt | 42 pt | 42 pt |
| END POINT : | ROUND CAP | ROUND CAP | ROUND CAP |
| END POINT<br>PROCESSING<br>UNNECESSARY<br>FLAG : | (0, 1) | (1, 1) | (1, 0) |

IMAGE PROCESSING APPARATUS AND CONTROL METHOD THEREOF, AND PROGRAM

BACKGROUND OF THE INVENTION

1. Field of the Invention

The present invention relates to an image processing apparatus for executing processing of input image data and a control method thereof, and a program.

2. Description of the Related Art

An image input/output system which is connected on a network, executes image data processing for external or internal image data, and outputs the processed image data is known.

As this image data input/output system, a so-called MFP (Multi Function Peripheral) is available.

FIG. 20 shows a controller 100 which controls the conventional MFP. In the controller 100, a CPU 102, memory controller (MC) 103, general-purpose bus 105, image processor 110, and image data rasterizer (RIP) 113 are connected via a system bus bridge (SBB) 101. Note that "RIP" is short for Raster Image Processor.

A hard disk controller (HDDCont) 106 which controls a large-capacity storage unit (HDD (hard disk drive)) 107 that stores image data is connected to the general-purpose bus 105. Also, a network I/F 109 which serves as an interface used to transfer image data with external devices via a network 108, to which the MFP is connected, is connected to the general-purpose bus 105. The image data includes those in page vector formats (PDL (page description language), PDF, SVG, and the like).

The HDD (hard disk drive) 107 is connected to the HDD-Cont 106. The HDD 107 is used as a storage medium of image data. Likewise, a system memory (Memory) 104 is connected to the MC 103. The system memory 104 is used as a medium for temporarily storing image data. The system memory 104 generally comprises a DIMM.

A scanner 111 and printer 112 are connected to the image processor 110. The image processor 110 applies predetermined image processing to image data input from the scanner 111, and outputs the processed image data to the controller 100. The image processor 110 applies predetermined image processing to image data stored in the controller 100, and outputs the processed image data to the printer 112.

Image data to be handled by the controller 100 include those in the page vector format (PDL, PDF, SVG, or the like), which are exchanged with external devices via the network, and those in the raster data format, which are exchanged with the scanner 111 and printer 112. The CPU 102 interprets image data in the page vector format input from an external device into primitive objects to convert it into intermediate data (DL data) called a DL (DisplayList), and outputs the DL data to the RIP 113.

These image data are temporarily stored in the system memory 104 in the controller 100. For this reason, many kinds of data such as raster data, page vector data (PDL or the like), DL data, and the like are stored on the system memory 104.

The HDD 107 stores image data input from the scanner 111, and raster data rendered by the RIP 113 as image data.

The RIP 113 often uses a method of processing blocks with a predetermined size such as bands, tiles, or the like determined in advance as processing regions in place of pages. By setting this processing region as a block such as a band, tile, or the like, which is smaller than a page, the memory capacity required upon rasterizing image data in the RIP 113 can be advantageously reduced. Furthermore, by parallelly executing processing for respective blocks, the rasterize processing in the RIP 113 can be advantageously speeded up.

In the aforementioned image processing system, for example, a line or curve object which extends over a plurality of blocks in a page often exists. By roughly classifying the rasterize processing method in this case, two methods, that is, a method of extracting only portions of that object included in the respective blocks and rasterizing them, and a method of dividing the object into those for respective blocks in advance, and rasterizing them are available (Japanese Patent Laid-Open No. 2004-120639).

In the former method, as processing for each block, the RIP 113 rasterizes the object partway based on control point coordinates and attribute information of the object. The RIP 113 then checks if the object is included in each block. If the object is included in that block, the RIP 113 rasterizes only the included portion, thus ending the rasterize processing of the object in that block.

In the latter method, the control point coordinates and attribute information of the object are converted into those for respective blocks of the object, and are temporarily stored. After that, the RIP 113 rasterizes the object based on the control point coordinates and attribute information for each block, thus ending the rasterize processing of the object in that block.

Note that rasterize processing of line and curve objects mainly includes three types of processes: (1) an outline process for calculating the outline coordinates of the object, (2) a line width process for calculating coordinates separated by a predetermined distance from the outline, and (3) an end point process for calculating coordinates from the end points of the outline based on attribute information. With these processes, fill processing of the object is attained.

In the prior art, upon extracting and rasterizing only portions of line and curve objects included in blocks, it is effective to use a band or tile which has a relatively large processing unit. However, if too small a processing unit is used, the number of objects to be rasterized in respective blocks does not decrease, but the processing volume increases since the number of blocks to be processed increases. Therefore, it is difficult to further shorten the processing time and to reduce the storage capacity.

On the other hand, upon dividing line and curve objects into those for respective blocks and rasterizing these object in the prior art, the number of objects to be rasterized for respective blocks decreases. Hence, the processing time per unit block can be shortened. However, when an original object is divided into blocks, and each block is rasterized to a bitmap image, since each individual divided block is independently rasterized, a problem is posed.

That problem will be explained below taking FIG. 21 as an example.

Reference numeral 2001 denotes a part of page vector data, that is, a diagram based on an actually rasterized image. In this example, the page vector data 2001 has object data 2002 of a line segment. The object data 2002 is configured by vector data (illustrated as a white line in FIG. 21) designated with an instruction that connects initial and terminal point coordinates by a straight line, and a line width (that in a direction perpendicular to the white line) of that vector data. Assume that this page vector data 2001 is divided into block vector data 2003 and 2004.

The object data 2002 is divided into object data 2005 and 2006, which are respectively held in the block vector data 2003 and 2004. The block vector data 2003 and 2004 are independently rasterized using only the object data 2005 and 2006 included in themselves. For this reason, partial images in the original object data 2002 are omitted at the boundary between the blocks like the rasterized result, that is, raster data 2007 (first problem).

As another problem of a line object, a broken line object has attributes that designate line segment parts of the broken line, and blank parts of the line segments as its attribute values in some cases. When dividing page vector data having such a broken line object into block vector data, a blank part of the broken line deviates, as denoted by 12102 with respect to a desired output result 12101, as shown in FIG. 22 (second problem).

A case will be examined wherein page vector data of an object having a pattern whose color value gradually changes like a gradation pattern undergo conversion to block vector data.

Normally, a rendering instruction of gradation is expressed by the coordinate values of initial and terminal points, and a predetermined color value change amount. Upon dividing a gradation object in page vector data into block vector data, gradation is expressed by arranging a plurality of thin line segments having different color values.

According to this method, even when an object is divided, a gradation pattern can be expressed for respective block vector data. However, when the block vector data are re-used to restore page vector data, or when an edit operation is to be made for respective block vector data, the gradation pattern is segmented into blocks that are too small to restore the page vector data or to enable the edit operation (third problem).

SUMMARY OF THE INVENTION

The present invention has been made to solve the aforementioned problems, and has as its object to provide an image processing apparatus which can implement vectorization that can faithfully reclaim raster data before vectorization based on vector data of an object which has undergone vectorization for respective blocks and a control method thereof, and a program.

According to one aspect of the present invention, an image processing apparatus for executing processing for input image data, comprising:

input means for inputting image data;

division means for, when the image data input by the input means is divided into blocks each having a set block size and the image data includes an object which extends over a plurality of blocks to be divided, dividing the object based on object information associated with the object;

setting means for re-setting the object information of the divided object based on the object information associated with the object divided into blocks by the division means; and generation means for generating block vector image data for respective blocks using the object information re-set by the setting means.

In a preferred embodiment, the apparatus according to claim 1, wherein the setting means re-sets coordinate information of the divided object based on coordinate information included in the object information of the object divided into blocks by the division means.

In a preferred embodiment, the setting means re-sets attribute information of the divided object based on attribute information included in the object information of the object divided into blocks by the division means.

In a preferred embodiment, the apparatus further comprises reconfiguration means for, when an object can be rendered within one block based on the object information of the object but the object need be rendered to extend over a plurality of blocks upon application of attribute information included in the object information, reconfiguring the object within respective blocks.

In a preferred embodiment, when the object reconfigured by the reconfiguration means exists, the generation means executes vectorization processing for respective blocks to which the object belongs to generate block vector data.

In a preferred embodiment, attribute information included in the object information is a line width.

In a preferred embodiment, attribute information included in the object information is an interpolation method of end points of the object.

In a preferred embodiment, the setting means further re-sets a flag used to distinguish end points generated by division and original end points of the object before division to end points of the object after division by the division means as object information of the divided object.

In a preferred embodiment, the apparatus further comprises:

storage means for storing the block vector image data generated by the generation means; and rasterization means for rasterizing the block vector image data stored in the storage means to raster image data.

In a preferred embodiment, the rasterization means rasterizes the object to raster image data based on the object information of the object included in the block vector image data to be processed.

In a preferred embodiment, the rasterization means executes end point processing required to render end points of an object to be processed based on a flag value of a flag included in the object information.

According to another aspect of the present invention, a method of controlling an image processing apparatus for executing processing for input image data, comprising:

an input step of inputting image data;

a division step of dividing, when the image data input in the input step is divided into blocks each having a set block size and the image data includes an object which extends over a plurality of blocks to be divided, the object based on object information associated with the object;

a setting step of re-setting the object information of the divided object based on the object information associated with the object divided into blocks in the division step; and a generation step of generating block vector image data for respective blocks using the object information re-set in the setting step.

According to still another aspect of the present invention, a computer program stored in a computer-readable medium to make a computer execute control of an image processing apparatus for executing processing for input image data, comprising:

an input step of inputting image data;

a division step of dividing, when the image data input in the input step is divided into blocks each having a set block size and the image data includes an object which extends over a plurality of blocks to be divided, the object based on object information associated with the object;

a setting step of re-setting the object information of the divided object based on the object information associated with the object divided into blocks in the division step; and a generation step of generating block vector image data for respective blocks using the object information re-set in the setting step.

Further features of the present invention will become apparent from the following description of exemplary embodiments with reference to the attached drawings.

BRIEF DESCRIPTION OF THE DRAWINGS

FIG. 7 shows a description example of page vector data according to the first embodiment of the present invention;

FIG. 13 is a diagram showing an example of division processing of a broken line object according to the second embodiment of the present invention;

FIG. 14 is a diagram of a graphic object according to the third embodiment of the present invention;

FIG. 17 is a diagram showing an example of object division processing according to the fifth embodiment of the present invention;

FIG. 18 is a diagram showing an example of conventional division processing of line and curve objects;

FIG. 19 is a diagram showing an example of division processing of line and curve objects according to the sixth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

[Overview of MFP]

Figure 1:
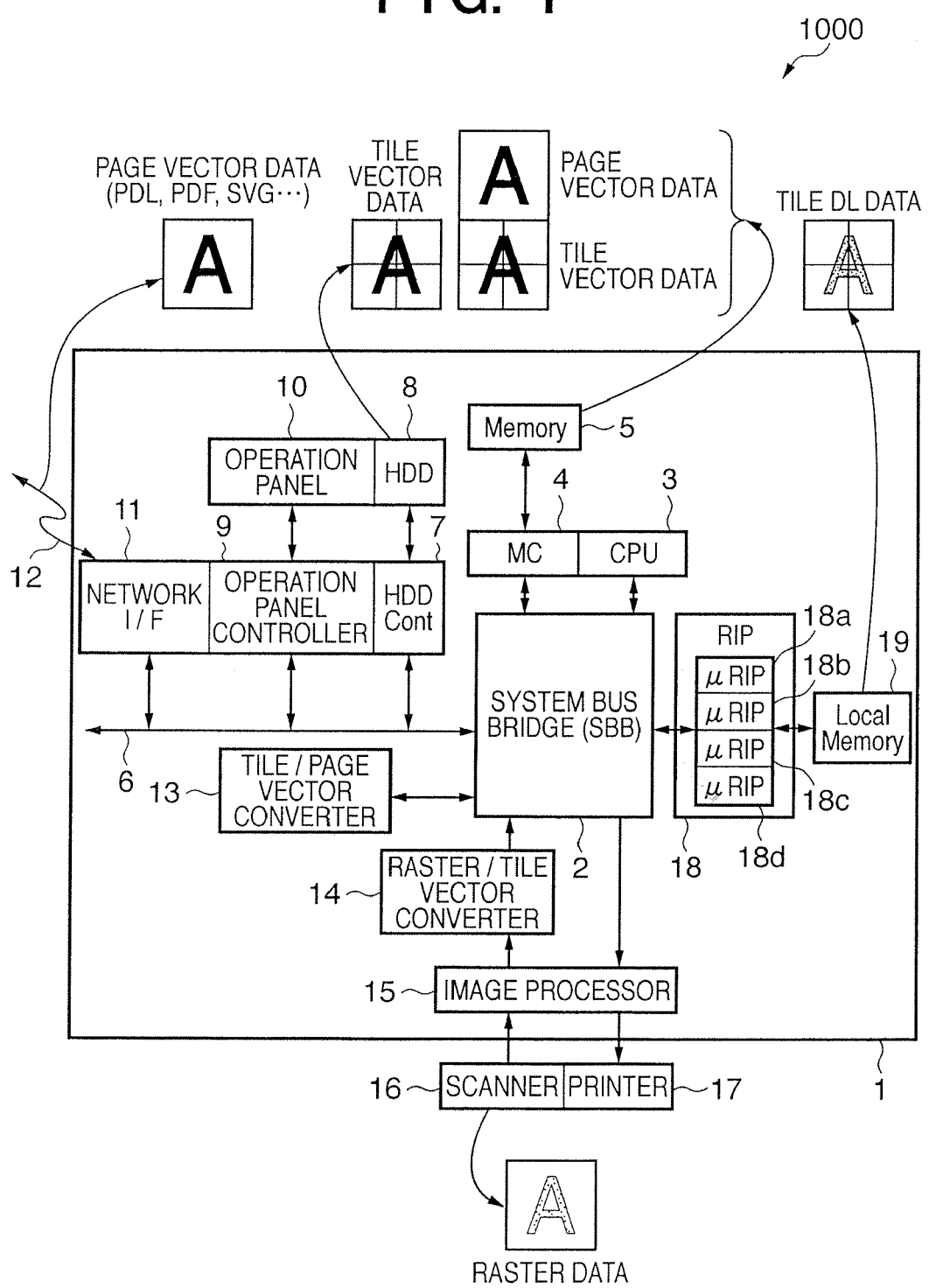
FIG. 1 is a block diagram showing details of a controller of an MFP which forms an image processing system according to the first embodiment of the present invention.

FIG. 1 is a block diagram showing details of a controller of an MFP which forms an image processing system according to the first embodiment of the present invention.

In a controller 1 which controls an MFP 1000, a CPU 3, memory controller (MC) 4, and general-purpose bus 6 are connected via a system bus bridge (SBB) 2. Furthermore, a tile/page vector converter 13, raster/tile vector converter 14, image processor 15, and image data rasterizer (RIP) 18 are connected to the SBB 2.

The RIP 18 can rasterize tile vector data, and includes a plurality of small image data rasterizers (μRIPs) 18a to 18d.

A system memory (Memory) 5 is connected to the MC 4. The system memory 5 is used as a medium for temporarily storing image data.

A hard disk controller (HDDCont) 7 which controls a large-capacity storage unit (HDD (hard disk drive)) 8 that stores image data, and a operation panel controller 9 which controls a operation panel (for example, a touch panel including an LCD and the like) 10 are connected to the general-purpose bus 6. Furthermore, a network I/F 11 which serves as an interface used to transfer image data with external devices via a network 12 is connected to the general-purpose bus 6.

Note that the operation panel 10 displays an operation window used to input execution instructions of various kinds of processing of the first embodiment and embodiments to be described later, and to display processing results and the like. The user can realize various operations via this operation window.

An image processor 15 is connected to the raster/tile vector converter 14. A scanner 16 and printer 17 are connected to the image processor 15.

The RIP 18 is connected to the SBB 2. A local memory (LocalMemory) 19 that stores data output from the RIP 18 is connected to the RIP 18.

Image data to be handled by the controller 1 are interfaced by those in vector (PDL, PDF, SVG, and the like) formats (to be also referred to as vector data hereinafter). Also, input/output data with the scanner 16 and printer 17 are interfaced as image data in a raster format (to be also referred to as raster data hereinafter).

In the controller 1, the raster/tile vector data converter 14 converts scan data (raster data) into tile vector data. Tile DL data obtained based on this tile vector data via the processing of the RIP 18 is stored in the local memory 19 connected to the RIP 18.

Therefore, only two types of image data, that is, page vector data and tile vector data are stored on the system memory 5. That is, raster data and DL data having large image data sizes need not be stored on the system memory 5. For this reason, an image data area that must be assured on the system memory 5 can be reduced.

DL data output from the RIP 18 is stored as tile DL data which is divided into tiles. Hence, the tile DL data can be stored by a very smaller memory capacity than conventional page DL data for respective pages. Therefore, the local memory 9 can be mounted on a chip to reduce the memory latency. As a result, a high tile data rasterize speed can be assured.

Since only tile vector data are stored on the HDD 8 as image data, a bottleneck of the access speed to the HDD 8 can be relaxed, thus speeding up the data processing. At the same time, a cost reduction of the RIP 18 can be attained since processing is done for respective tiles.

When a still higher throughput is required, the throughput can be varied by parallelly mounting the plurality of μRIPs 18a to 18d included in the RIP 18. In this way, since the throughput of the controller 1 can be simply adjustment, a system that can assure scalability can be built.

In the present invention, the network I/F 11 and scanner 16 serve as an image input unit which inputs image data into the controller 1. Also, the network I/F 11 and printer 17 serve as an image output unit which outputs image data.

The data flows of various kinds of processing that the MFP can implement will be described below.

[Copy]

Figure 2:
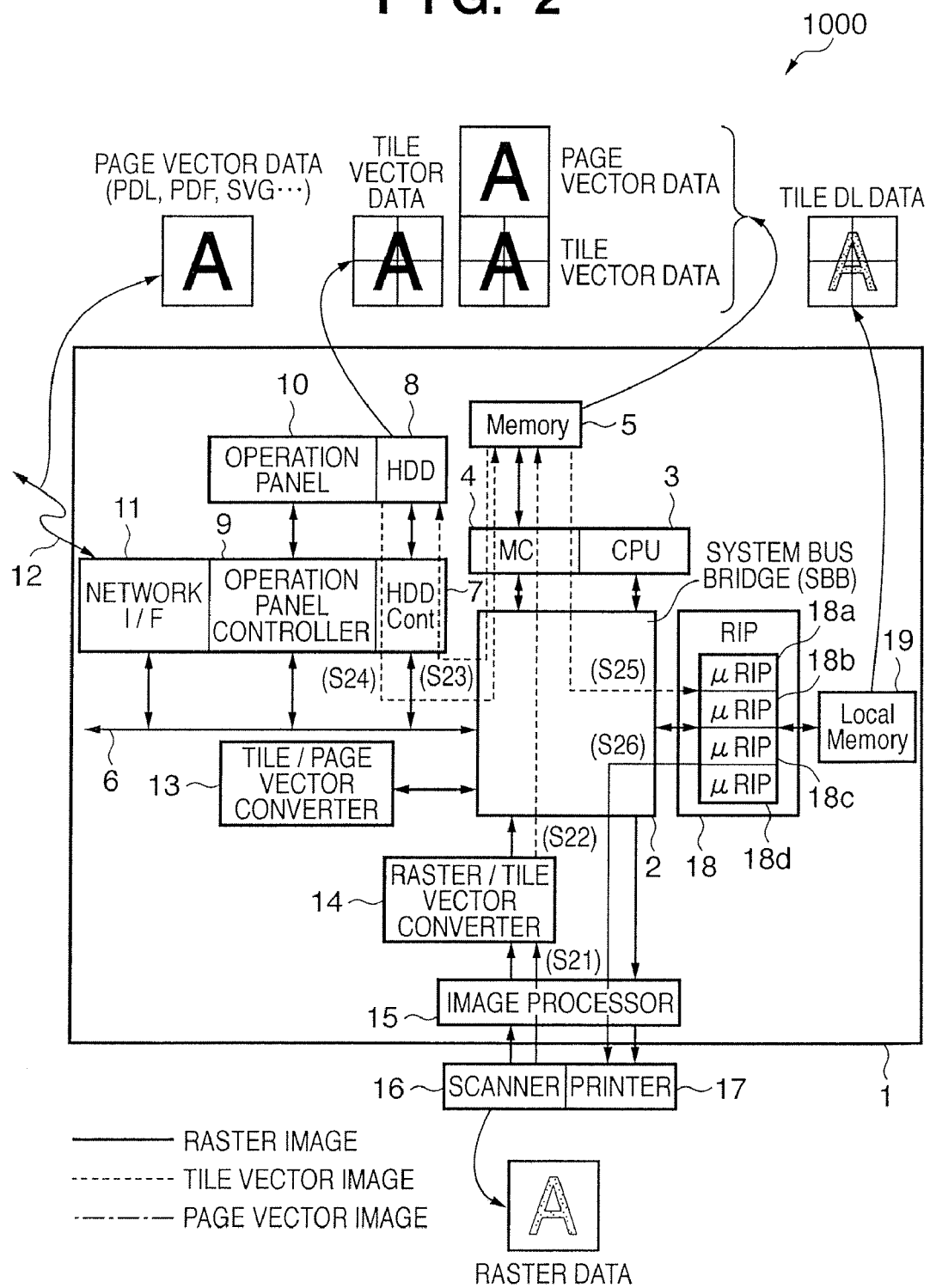
FIG. 2 is a diagram showing data flows associated with a copy operation in the image processing system according to the first embodiment of the present invention.

FIG. 2 is a diagram showing the data flows associated with a copy operation in the image processing system according to the first embodiment of the present invention.

Note that the data flows are implemented when respective building components which form the MFP 1000 are operated in collaboration with each other under the control of the CPU 3.

Arrows shown in FIG. 2 indicate various data flows. In particular, the solid arrow indicates the data flow of raster data (raster image data), the broken allow indicates that of tile vector data (tile vector image data), and the one-dashed chain line arrow indicates that of page vector data (page vector image data). The page vector data and tile vector data will be described in detail later in association with the tile/page vector converter 13.

(S21): When the user inputs a copy start instruction from the operation panel 10, the scanner 16 starts the scanning operation of a document image. An image (R, G, and B image components) input from the scanner 16 to the image processor 15 is frequency-converted in synchronism with clocks of the image processor 15, and then undergoes, for example, the following processing:

1) correction processing of scanner characteristics such as the line pitch, chromatic aberration, and the like of a CCD sensor in the scanner 16;

2) image quality correction processing of input image data such as color space correction, sharpness, and the like; and 3) image modification processing such as frame erase of input image data, book frame erase, and the like.

(S22): Image data which has undergone image processing by the image processor 15 and is output from the image processor 15 is input to the raster/tile vector converter 14, and undergoes tile vector conversion processing. That is, the raster/tile vector converter 14 divides the image data into blocks (tiles) each having a predetermined size. The raster/tile vector converter 14 applies vectorization processing to raster data in respective blocks to generate vector data (tile vector data (block vector data)) for respective blocks (tiles).

The generated tile vector data undergo bus arbitration by the SBB 2 to acquire a bus authorization to the system memory, and are stored in the system memory 5 via the MC 4. When a data path is connected via the SBB 2, each data goes through a procedure in that it basically undertakes bus arbitration to acquire bus authorization. However, a description of such procedure will not be given in the following flow description.

(S23): The tile vector data stored in the system memory 5 are stored in the HDD 8 through the SBB2 via the HDDCont 7 and MC4. By storing the tile vector data in the HDD 8, they can be sorted upon copying a plurality of copies of documents and can be output by changing their page order, or they can be stored as saved image data in the MFP 1000.

(S24): The HDDCont 7 reads out the tile vector data stored in the HDD 8 in synchronism with a printer ready timing sent from a printer CPU (not shown) in the printer 17. Then, the readout tile vector data are temporarily stored in the system memory 5 through the SBB 2 and MC 4.

If the readout tile vector data are directly output from the HDD 8 to the printer 17, it is not guaranteed to output these data in synchronism with the printer 17 depending on the constrained access speed of the HDD 8 or the degree of traffic on the general-purpose bus 6. For this reason, by spooling page vector data in the system memory 5 before data transfer in synchronism with the printer 17, a real-time throughput is guaranteed.

(S25): The MC 4 reads out the title vector data stored in the system memory 5 in accordance with a startup signal sent from the printer 17 to the controller 1, and transfers them to the RIP 18 via the SBB 2.

The RIP 18 analyzes the tile vector data to execute generation (interpretation) of rendering objects (tile DL data) for respective tiles. The generated tile DL data are temporarily stored in the local memory 19.

The RIP 18 reads out the tile DL data from the local memory 19, rasterizes them to raster data (tile raster data) for respective tiles, and outputs the raster data.

In the first embodiment, the RIP 18 comprises the four small image data rasterizers (μRIPs) 18a to 18d, as described above. The controller 1 can speed up rasterization of the tile vector data by parallelly operating the μRIPs 18a to 18d.

Note that the vector data rasterize time is dominant in the overall performance of the image processing system, and it is expected to enhance the performance by increasing the number of μRIPs. For this reason, using the configuration of the present invention, a scalable system can be easily built by increasing/decreasing the number of μRIPs or that to be operated.

(S26): The tile raster data generated by the RIP 18 are transferred to the image processor 15 and undergo, for example, the following processing:

1) conversion processing from the tile raster data into page raster data;

2) correction processing of the colors and densities of an output image to match the printer characteristics;

3) halftone processing for performing tone conversion of the output image by quantizing the image data; and 4) frequency conversion processing required to output the image in synchronism with printer I/F clocks.

Raster data that has undergone image processes 1) to 4) by the image processor 15 is transferred to the printer 17, and is printed out on a print medium.

[Print]

Figure 3:
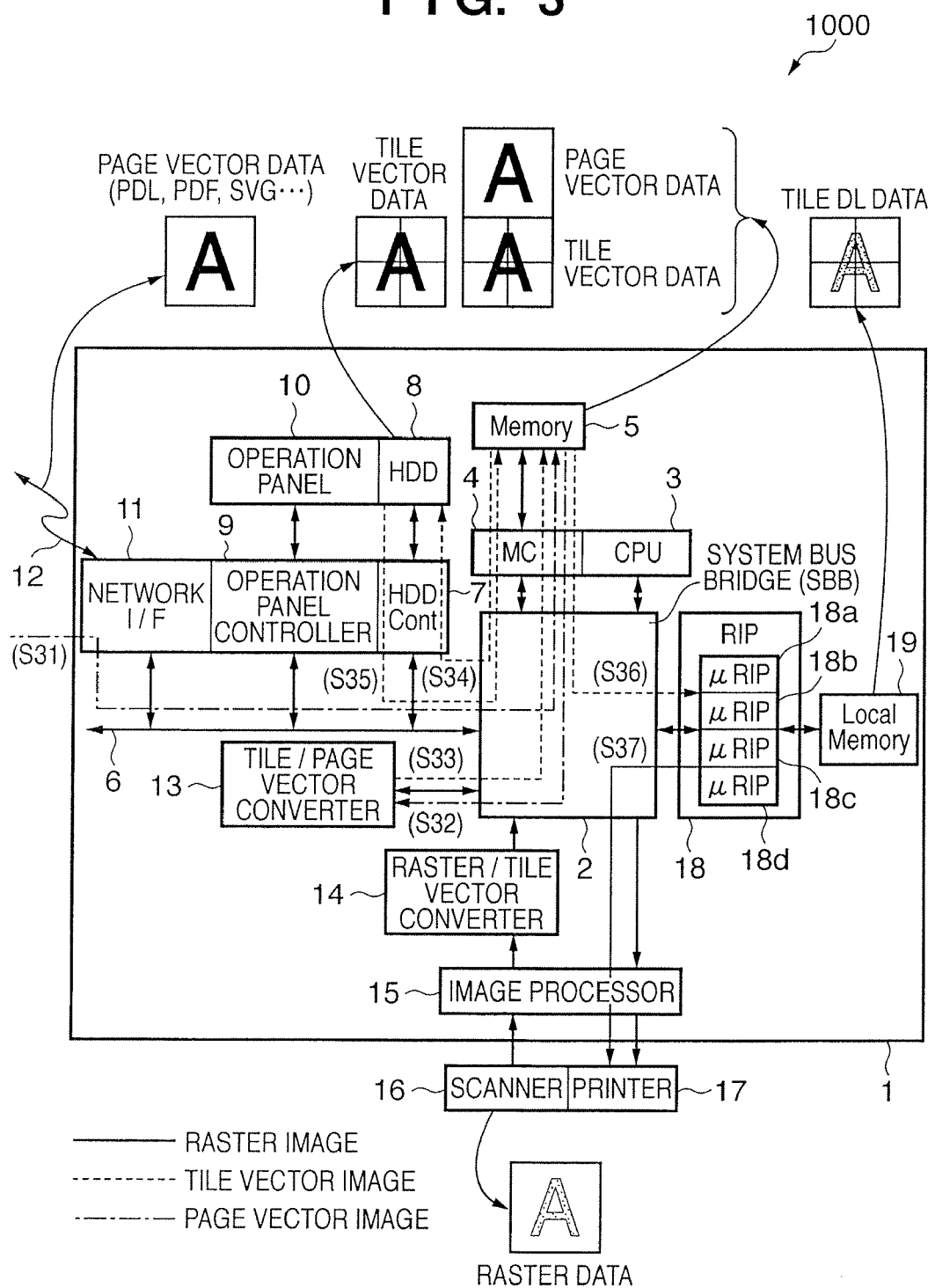
FIG. 3 is a diagram showing data flows associated with a print operation in the image processing system according to the first embodiment of the present invention.

FIG. 3 is a diagram showing the data flows associated with a print operation in the image processing system according to the first embodiment of the present invention.

Note that the data flows are implemented when respective building components which form the MFP 1000 are operated in collaboration with each other under the control of the CPU 3.

(S31): The network I/F 11 connected to the general-purpose bus 6 receives page vector data from an external device connected to the network 12. The network I/F 11 transfers the received data to the system memory 5 via the MC 4 connected after the SBB 2.

(S32): The tile/page vector converter 13 reads out the page vector data stored in the system memory 5, and applies tile vector conversion processing to the readout data. That is, the tile/page vector converter 13 divides each object present in the page vector data into objects each of which falls within a block (tile) having a predetermined size. The converter 13 then generates vector data (tile vector data) for respective tiles.

(S33): The generated tile vector data are stored in the system memory 5 again via the SBB 2.

(S34): The tile vector data stored in the system memory 5 are stored in the HDD 8 through the SBB2 via the HDDCont 7 and MC4. By storing the tile vector data in the HDD 8, they can be sorted upon copying a plurality of copies of documents and can be output by changing their page order, or they can be stored as saved image data in the MFP 1000.

(S35): The HDDCont 7 reads out the tile vector data stored in the HDD 8 in synchronism with a printer ready timing sent from a CPU (not shown) in the printer 17. Then, the readout tile vector data are temporarily stored in the system memory 5 through the SBB 2 and MC 4.

If the readout tile vector data are directly output from the HDD 8 to the printer 17, it is not guaranteed to output these data in synchronism with the printer 17 depending on the constrained access speed of the HDD 8 or the degree of traffic on the general-purpose bus 6. For this reason, by spooling vector image data for one page in the system memory 5 before data transfer in synchronism with the printer 17, a real-time throughput is guaranteed, (S36): The MC 4 reads out the title vector data stored in the system memory 5 in accordance with a startup signal sent from the printer 17 to the controller 1, and transfers them to the RIP 18 via the SBB 2.

The RIP 18 analyzes the tile vector data to execute generation (interpretation) of rendering objects (tile DL data) for respective tiles. The generated tile DL data are temporarily stored in the local memory 19.

The RIP 18 reads out the tile DL data from the local memory 19, rasterizes them to raster data (tile raster data) for respective tiles, and outputs the raster data.

(S37): The tile raster data generated by the RIP 18 are transferred to the image processor 15 and undergo, for example, the following processing:

1) conversion processing from the tile raster data into page raster data;
2) correction processing of the colors and densities of an output image to match the printer characteristics;
3) halftone processing for performing tone conversion of the output image by quantizing the image data; and
4) frequency conversion processing required to output the image in synchronism with printer I/F clocks, Raster data that has undergone image processes 1) to 4) by the image processor 15 is transferred to the printer 17, and is printed out on a print medium.

[Send]

Figure 4:
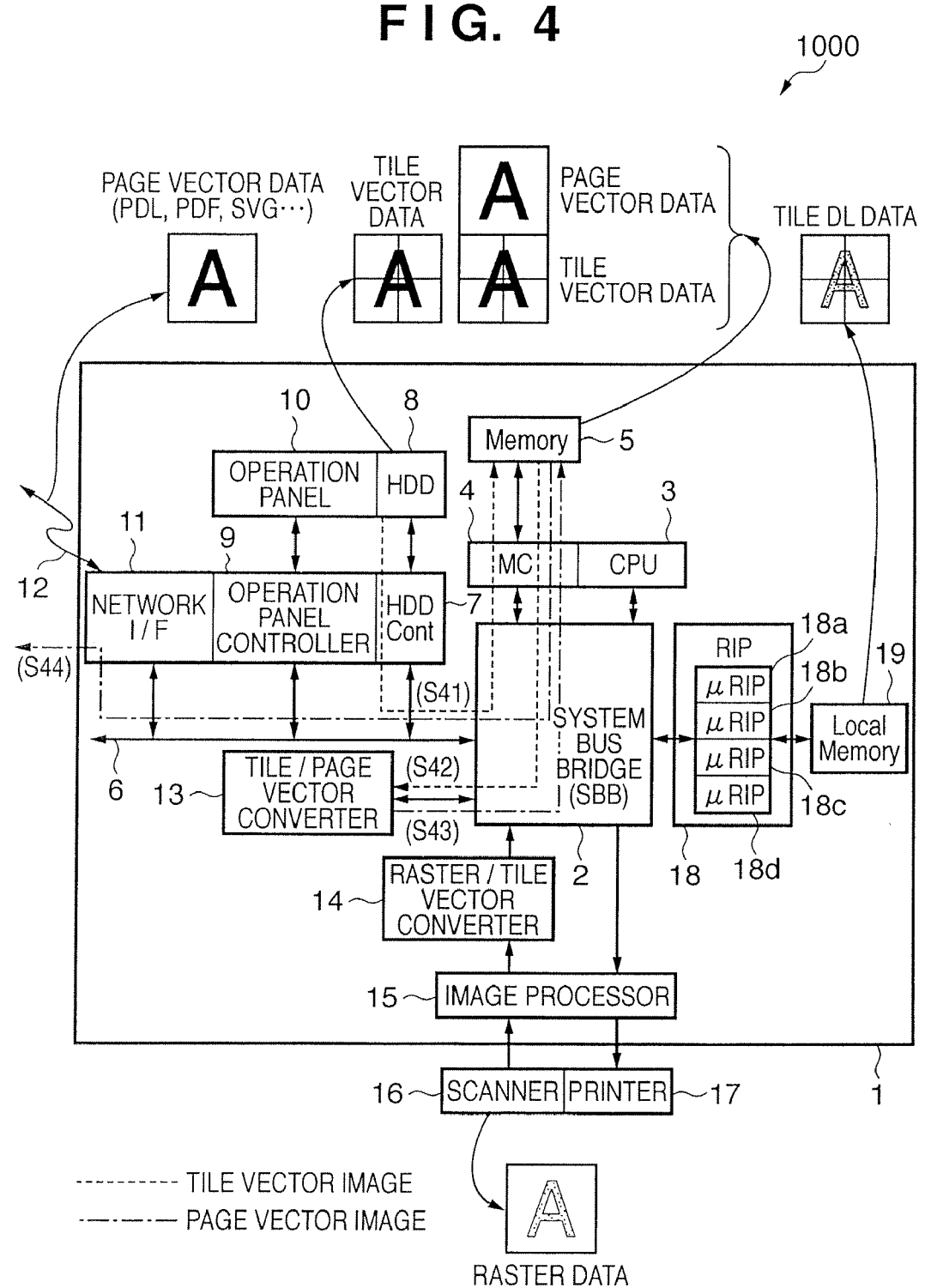
FIG. 4 is a diagram showing data flows associated with a send operation in the image processing system according to the first embodiment of the present invention.

FIG. 4 is a diagram showing the data flows associated with a send operation in the image processing system according to the first embodiment of the present invention.

Note that the data flows are implemented when respective building components which form the MFP 1000 are operated in collaboration with each other under the control of the CPU 3.

Also, since the data flow until image data is stored in the HDD 8 is the same as in [copy] in case of raster data, or is the same as [print] in case of page vector data input from an external device on the network 12, a description thereof will be omitted.

Note that the processing for storing image data in the HDD 8 may be executed in response to a storage instruction from the user, or the image data may automatically remain stored in the HDD 8 in case of the [copy] or [print] processing. Send processing executed when the user gives the instruction to send image data designated from those stored in the HDD 8 in this way will be described below.

(S41): The HDDCont 7 connected to the general-purpose bus 6 reads out the tile vector data stored in the HDD 8 via the SBB 2 and temporarily stores them in the system memory 5.

(S42): The tile/page vector converter 13 reads out the tile vector data stored in the system memory 5, and applies tile vector conversion processing to the readout data. More specifically, the converter 13 combines the objects divided for respective blocks to generate page vector data which describes an object for the full page. That is, the converter 13 generates page vector data indicating vector data for the full page based on the tile vector data for one page.

(S43): The generated page vector data is stored in the system memory 5 again via the SBB 2.

(S44): The network I/F 11 connected to the general-purpose bus 6 reads out the page vector data stored in the system memory 5, and sends and transfers it to an external device connected to the network 12.

By restoring tile vector data to page vector data to reduce the number of objects that form the data upon sending to an external device like in the present invention, the send data volume can be reduced. Also, the data can be easily converted into a general-purpose format such as PDF, SVG, or the like.

Note that the present invention can also send raster data input from the scanner 16 to an external device. In this case, it is preferable to convert the raster data into page vector data, and to send the page vector data to an external device.

[Raster/Tile Vector Converter]

Details of the processing of the raster/tile vector converter 14 will be described below.

Figure 5:
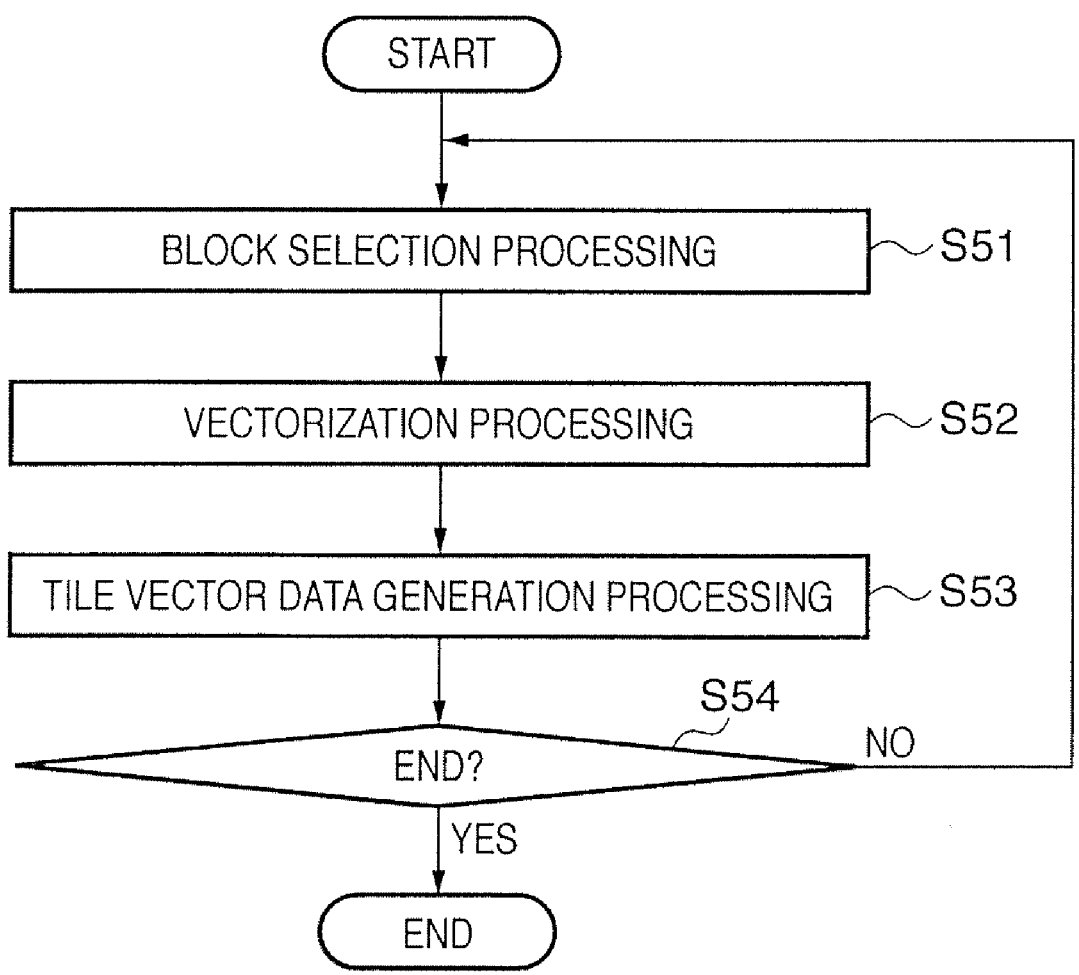
FIG. 5 is a flowchart showing processing to be executed by a raster/tile vector converter according to the first embodiment of the present invention.

FIG. 5 is a flowchart showing processing to be executed by the raster/tile vector converter according to the first embodiment of the present invention.

(Step S51: Block Selection (BS) Processing)

The raster/tile vector converter 14 divides raster data (image data) input from the image processor 15 into a text/line image region including text or a line image, a halftone photo region, an image region with an indeterminate shape, and the like. The converter 14 further divides the text/line image region into a text region mainly including text, and a line image region mainly including a table, graphic, and the like, and divides the line image region into a table region and graphic region.

Note that the first embodiment detects coupled pixels, and divides image data into regions for respective attributes using the shapes, sizes, pixel densities, and the like of circumscribing rectangular regions of the coupled pixels. However, any other region division methods may be used.

The text region is divided into rectangular blocks (text region rectangular blocks) combined as clusters for respective paragraphs of text. The line image region is divided into rectangular blocks for individual objects such as a table, graphic, and the like (table region rectangular block, line image region rectangular block).

A photo region expressed by halftone is divided into rectangular blocks for respective objects such as an image region rectangular block, background region rectangular block, and the like.

The divided regions are further divided into regions (tiles) each having a predetermined size, and the divided tiles undergo vectorization in the next vectorization processing.

(Step S52: Vectorization Processing)

The raster/tile vector converter 14 converts image data of the regions of respective attributes into vector data (represents it as vector data) by vectorization processing. The vectorization method includes, for example, the following methods (a) to (f) and the like.

(a) When the region attribute is a text region, code conversion of character images by OCR is done or the sizes, styles, and faces of characters are recognized to be converted into font data visually faithful to characters obtained by scanning a document.

(b) When the region attribute is a text region, and recognition by means of OCR is impossible, the outlines of characters are traced to be converted into a format that expresses outline information as connections of line segments.

Note that the first embodiment has explained the example that uses one of methods (a) and (b) for the text region in accordance with the OCR result. However, the present invention is not limited to this. For example, only method (b) may be used for all the text regions without using method (a).

(c) When the region attribute is a graphic region, the outline of a graphic object is traced to be converted into a format that expresses outline information as connections of line segments.

(d) The outline information in the line segment format of methods (b) and (c) undergoes fitting using a Bezier function or the like to be converted into function information.

(e) The shape of the graphic is recognized based on the outline information of the graphic object of method (c) to convert the recognized shape into graphic definition information such as a circle, rectangle, polygon, or the like.

(f) When the region attribute is a graphic region and an object has a table format in a specific region, ruled lines and frame lines are recognized to be converted into a predetermined form format.

(Step S53: Tile Vector Data Generation Processing)

The raster/tile vector converter 14 generates a vector type used inside the controller 1 to determine page vector data or tile vector data for data which are vector-converted into command definition type information such as format code information, graphic information, function information, and the like of methods (a) to (f) in step S52. Furthermore, the converter 14 generates tile vector data by appending header information used to determine coordinate information such as the coordinate position of the tile of interest in a page and the like. The converter 14 outputs the tile vector data to which various kinds of information are appended for respective tiles to the SBB 2.

(Step S54: End Checking Processing)

The raster/tile vector converter 14 checks if raster data to be processed still remain. If raster data to be processed still remain (NO in step S54), the process returns to step S51. On the other hand, if raster data to be processed does not remain (YES in step S54), the processing ends.

[Tile/Page Vector Converter]

Prior to a description of details of the processing of the tile/page vector converter 13, document data (image data) to be processed will be described below.

Figure 6:
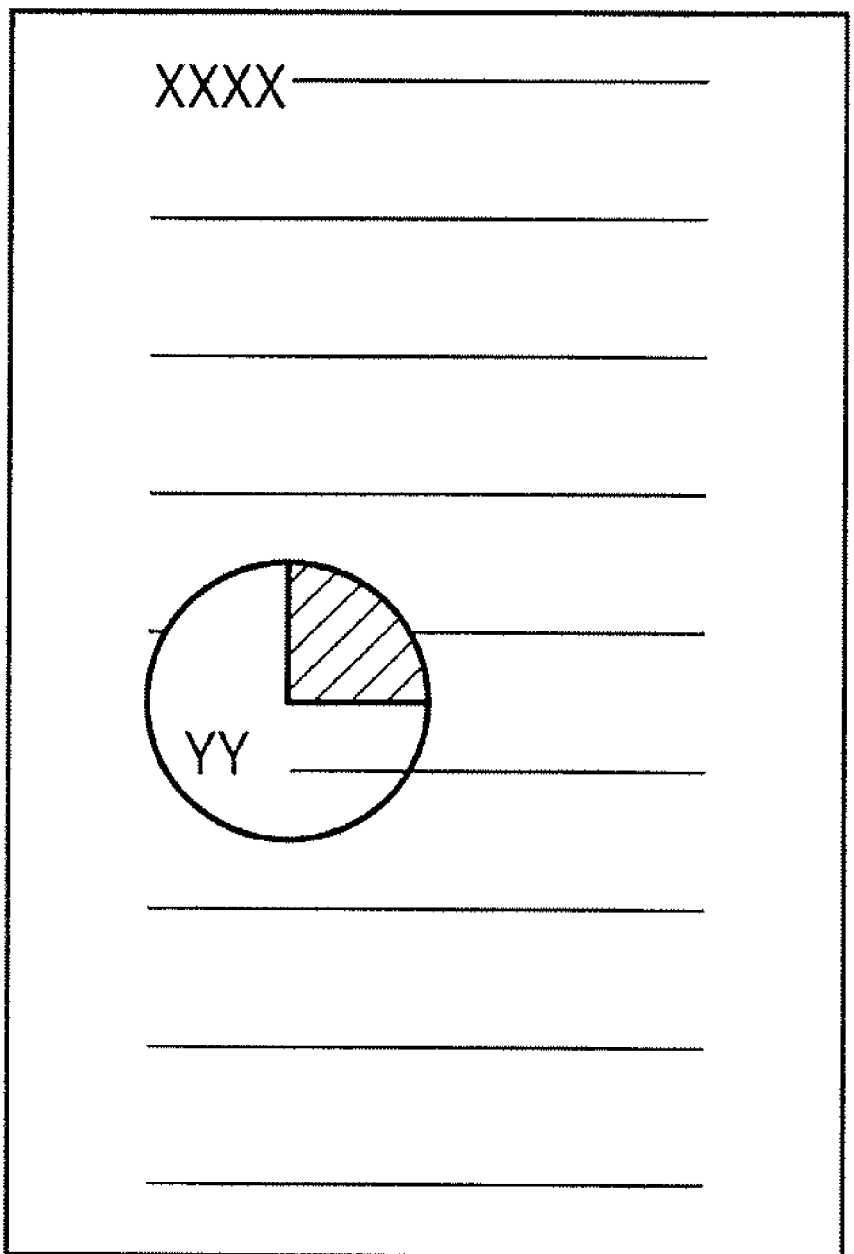
FIG. 6 shows an example of document data transferred from a network according to the first embodiment of the present invention.

FIG. 6 shows an example of document data transferred from the network according to the first embodiment of the present invention.

FIG. 6 defines a device coordinate system which has a short-side direction of document data 801 as an "X" direction, and a long-side direction as a "Y" direction. The document data 801 may include one of page vector data, tile vector data, page vector data (tile vector data) including raster data expression, and raster data.

A description example which configures the contents of the document data 801 when the document data 801 is page vector data will be described below with reference to FIG. 7.

FIG. 7 shows a description example of page vector data according to the first embodiment of the present invention.

Referring to FIG. 7, reference numeral 901 denotes a document setting instruction part associated with the settings of the overall document data; 902, a text rendering instruction part; and 903, a graphic rendering instruction part.

Respective rendering instruction parts will be described in detail below.

In the document setting instruction part 901, C1 to C5 indicate commands associated with the entire document data. Therefore, these commands C1 to C5 are appended to only one location per copy of a document.

These commands associated with the entire document data include, for example, a character set command (font designation command). Also, these commands include a scalable font command (a command used to designate whether or not to use scalable font), hard reset command (a command used to reset the previous printer use environment), and the like.

In this part, C1 is a document setting start command. C2 is a command indicating the output paper size of document data and includes an A4 setting in this case. C3 is a command indicating the direction of document data. The direction of document includes portrait and landscape directions, and in this case, C3 is set as portrait (PORT).

C4 is a command indicating the type of document data, and indicates document data made up of page vector data or that made up of tile vector data. In this case, C4 is set as page vector data (PAGE) C5 is a document setting end command.

C6 to C22 which form the text rendering instruction part 902 and graphic rendering instruction part 903 are various commands required to output document data.

C6 is a command indicating start of a page. C7 is a command used to select a font type of text, and is set as a font set with number "1" in this case. C8 is a command used to set a font size, and is set as a size "10 points" in this case.

C9 is a command used to set a text color, and indicates the luminance values of R (red), G (green), and B (blue) color components in turn. Assume that these luminance values are quantized by 256 levels ranging from 0 to 256. In this case, {0, 0, 0} is set. C10 is a command indicating the coordinates of the text rendering start position. The coordinate position (X, Y) designates the upper left corner of a page as an origin. In this case, C10 is set to start text rendering from the position {10, 5} of a page. C11 is a command indicating a character string (XXXX . . . YY . . . ) to actually be rendered.

C12 is a command indicating the fill color of a plane upon graphic rendering. The color is designated in the same manner as the text color. C13 is a command used to designate the color of a line upon graphic rendering. C14 is a command indicating the coordinates of a graphic rendering position.

C15 is a command used to designate the radius upon rendering an arc, and indicates a "10" coordinate unit in this case. C16 is a command used to render a closed arc. Two parameters in this command indicate the rendering start angle and end angle upon rendering an arc. This command indicates that an arc from 0° to 90° is to be rendered to have vertical information as 0°.

C17 to C21 are commands used to designate a fill color of a plane, line color, position, and the like upon graphic rendering as in the commands C12 to C16. C22 is a command indicating the end of a page.

A case will be described below wherein the document data 801 is tile vector data.

Figure 8:
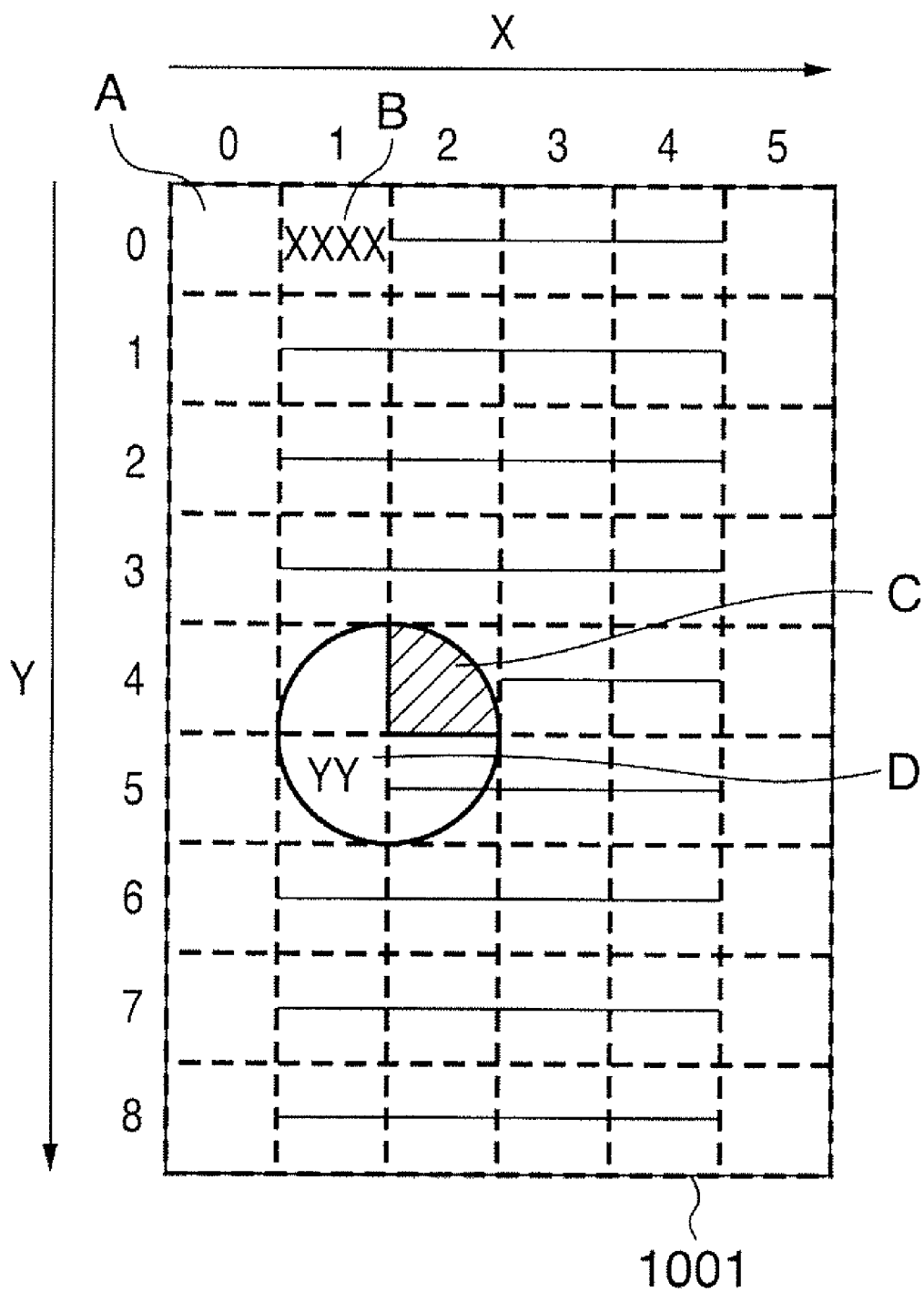
FIG. 8 shows an example of tile vector data according to the first embodiment of the present invention.

FIG. 8 shows an example of tile vector data according to the first embodiment of the present invention.

FIG. 8 shows an example of tile vector data (document data 1001) obtained by dividing the document data 801 (page vector data) in FIG. 6 into blocks (tiles).

FIG. 8 defines a device coordinate system which has a short-side direction of document data 1001 as an "X" direction, and a long-side direction as a "Y" direction. A numerical sequence arranged in the X direction in FIG. 8 represents a tile ID in the X direction, and that arranged in the Y direction represents a tile ID in the Y direction. A to D respectively indicate tile data located at tile IDs=(0, 0), (1, 0), (2, 4), and (1, 5).

A description example which configures the contents of this document data 1001 when the document data 1001 is tile vector data will be described below with reference to FIG. 9.

Figure 9:
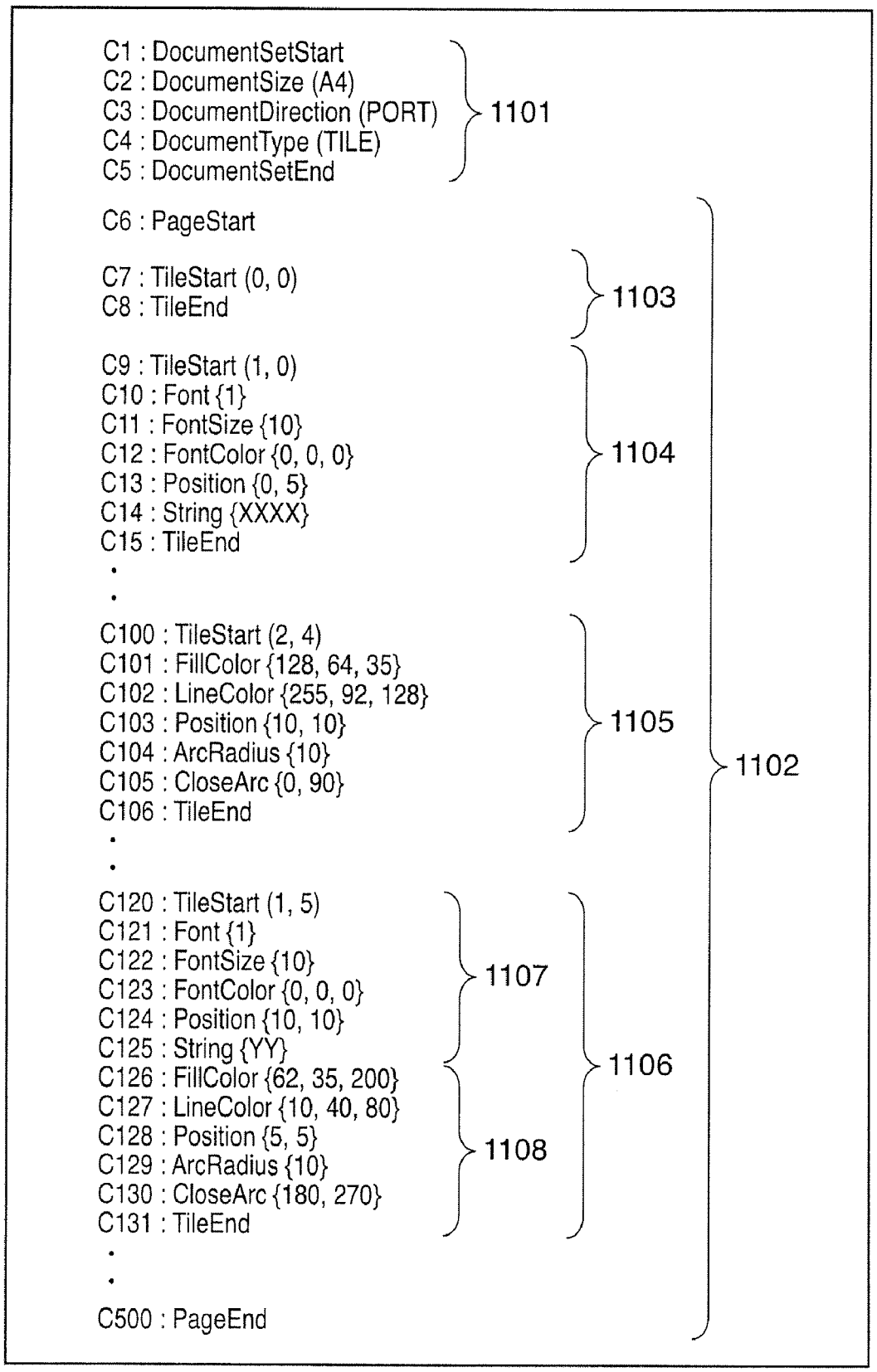
FIG. 9 shows a description example of tile vector data according to the first embodiment of the present invention.

FIG. 9 shows a description example of tile vector data according to the first embodiment of the present invention.

Referring to FIG. 9, reference numeral 1101 denotes a document setting instruction part associated with the settings of the entire document data; 1102, a whole rendering instruction part; and 1103 to 1106, rendering instruction parts of tiles A, B, C, and D, respectively. Reference numerals 1107 and 1108 respectively denote a text rendering instruction part and graphic rendering instruction part of tile D, respectively.

Details of respective rendering instruction parts will be described below.

In the document setting instruction part 1101, C1 to C5 are commands associated with the entire document. Therefore, these commands C1 to C5 are appended to only one location per copy of a document.

These commands associated with the entire document data include, for example, a character set command (font designation command). Also, these commands include a scalable font command (a command used to designate whether or not to use scalable font), hard reset command (a command used to reset the previous printer use environment), and the like.

In this part, C1 is a document setting start command. C2 is a command indicating the output paper size of document data and includes an A4 setting in this case. C3 is a command indicating the direction of document data. The direction of document includes portrait and landscape directions, and in this case, C3 is set as portrait (PORT).

C4 is a command indicating the type of document data, and indicates document data made up of page vector data or that made up of tile vector data. In this case, C4 is set as tile vector data (TILE). C5 is a document setting end command.

C6 to C500 which form the rendering instruction part 1102 are various commands required to output document data.

C6 is a command indicating start of a page. C7 is a command indicating the start of rendering commands of tile A in FIG. 8. Note that two parameters in TileStart (0, 0) indicate the tile ID in the document data. C8 is a command indicating the end of the rendering commands of tilt A. Like in tile 1, if there is no object in that tile, only commands indicating the start and end of the tile are described.

C9 is a command indicating the start of rendering commands of tile B in FIG. 8. C10 is a command used to select a font type of text, and is set as a font set with number "1" in this case. C11 is a command used to set a font size, and is set as a size "10 points" in this case.

C12 is a command used to set a text color, and indicates the luminance values of R (red), G (green), and B (blue) color components in turn. Assume that these luminance values are quantized by 256 levels ranging from 0 to 256. In this case, {0, 0, 0} is set. C13 is a command indicating the coordinates of the text rendering start position. The coordinate position (X, Y) designates the upper left corner of a tile as an origin. In this case, C13 is set to start text rendering from the position {0, 5} of a page. C14 is a command indicating a character string (XXXX) to actually be rendered. C15 is a command indicating the end of the rendering commands of tile B.

C100 is a command indicating the start of rendering commands of tile C in FIG. 8. C101 is a command indicating the fill color of a plane upon graphic rendering. The color is designated in the same manner as the text color. C102 is a command used to designate the color of a line upon graphic rendering. C103 is a command indicating the coordinates of a graphic rendering position.

C104 is a command used to designate the radius upon rendering an arc, and indicates a "10" coordinate unit in this case. C105 is a command used to render a closed arc. Two parameters in this command indicate the rendering start angle and end angle upon rendering an arc. This command indicates that an arc from 0° to 90° is to be rendered to have vertical information as 0°. C106 is a command indicating the end of the rendering commands of tile C.

C120 is a command indicating the start of rendering commands of tile D in FIG. 8. C121 to C130 are commands used to designate the type, color size, and the like of text font based on text rendering instructions as in the commands C9 to C15, and are commands used to designate the fill color of a plane, line color, position, and the like upon graphic rendering based on the graphic rendering instructions as in the commands C100 to C106. C131 is a command indicating the end of the rendering commands of tile D.

C500 is a command indicating the end of a page.

Details of the processing of the tile/page vector converter 13 will be described below with reference to FIG. 10.

Figure 10:
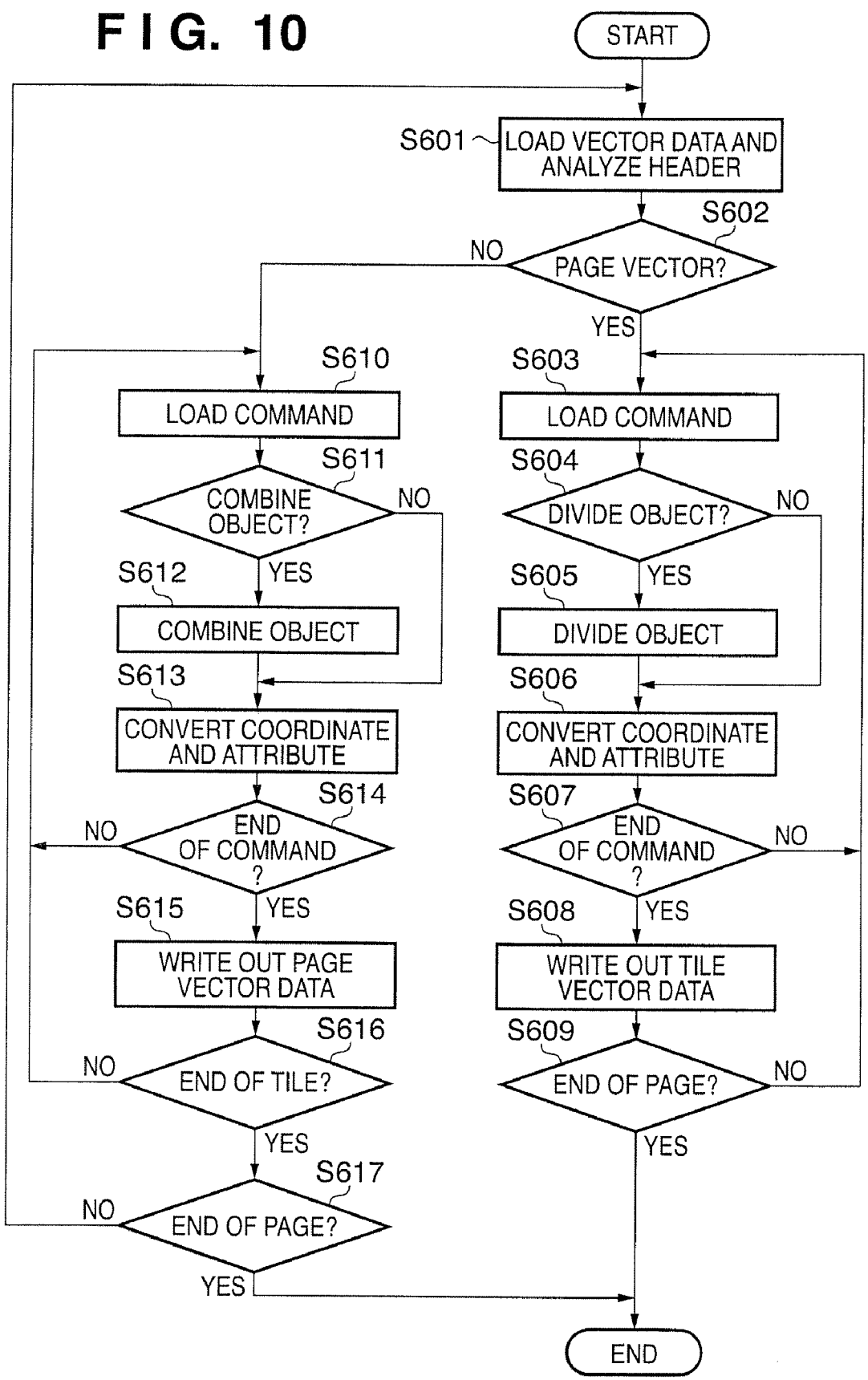
FIG. 10 is a flowchart showing processing to be executed by a tile/page vector converter according to the first embodiment of the present invention.

FIG. 10 is a flowchart showing processing to be executed by the tile/page vector converter according to the first embodiment of the present invention.

Note that this tile/page vector converter 13 can execute mutual conversion between page vector data and tile vector data. Alternatively, the tile/page vector converter 13 may comprise a converter for converting page vector data into tile vector data, and a converter for converting tile vector data into page vector data.

(Step S601)

The tile/page vector converter 13 loads a command sequence corresponding to a header part from document data (vector data) stored in the system memory 5, and analyzes a command part associated with the entire document data to be processed. More specifically, the converter 13 analyzes the contents of a part corresponding to C1 to C5 in FIG. 7 or 9.

(Step S602)

The tile/page vector converter 13 checks based on the analysis result if the type of the document data is page vector data. If the type of the document data is page vector data (YES in step S602), the process advances to step S603 and subsequent steps to execute page vector→tile vector conversion. On the other hand, if the type of the document data is not page vector data, that is, if it is tile vector data (NO in step S602), the process advances to step S610 and subsequent steps to execute tile vector→page vector conversion.

(Step S603)

The tile/page vector converter 13 loads a command sequence that describes an object from the page vector data.

(Step S604)

The tile/page vector converter 13 analyzes the command sequence loaded in step S603 and checks if the size of the described object exceeds a tile size to be divided. That is, the converter 13 checks if the object need be further divided.

If the size of the object does not exceed the tile size to be divided (NO in step S604), the process skips step S605 and advances to step S606. On the other hand, if the size of the object exceeds the tile size to be divided (YES in step S604), the process advances to step S605.

(Step S605)

The tile/page vector converter 13 executes the division processing of the input object in this step.

For example, in the page vector data shown in FIG. 7, the text rendering instruction part 902 describes the rendering instructions of all character strings including "XXXX . . . YY . . . ". By contrast, in the tile vector data in FIG. 9, the rendering instruction part 1104 for tile B describes only rendering instructions of a character string "XXXX".

Therefore, in the tile vector data, when a character string extends over a plurality of tiles, that character string is divided at an intermediate position (tile boundary), and the character string after this position is described in the next tile as another character string. If the description falls outside the next tile, the character string included in the tile is similarly divided, and this processing is repeated until all the divided character strings fall within the tile size. The dividing position of the character string is determined such that the number of characters that fall within a tile is calculated based on the font type and size, and characters as many as the calculation result are extracted.

For example, the number of characters that fall within a tile is calculated as "4" for the text rendering instruction part 902 of the page vector data shown in FIG. 7, and the description of the command C11 in FIG. 7 is converted into that of the command C13 which forms the rendering instructions for tile B.

In the graphic rendering instruction part 903, a graphic (a ¾ circle in FIG. 6) described by the commands C17 to C21 cannot fall within one tile that forms the tile vector data in FIG. 8. For this reason, this graphic is divided into a plurality of tiles including tile D. Upon dividing a graphic, a portion that contacts the boundary region of a tile is calculated based on the rendering position, shape, and size of the graphic, and a closed region formed by that boundary and a partial region of the graphic that falls within the tile is re-described as a new graphic.

A lower left partial region of a graphic (a ¾ circle in FIG. 6) described in the graphic rendering instruction part 903 in FIG. 7 is converted into a description of a ¼ circle described by the commands C126 to C130 in the graphic rendering instruction part 1108 in FIG. 9. Also, the remaining region is also converted into a description of ¼ circles with similar shapes. As in a circle, when a line, polygon formed of lines, or the like cannot fall within one tile, it is divided into a plurality of tiles for each object.

Object division processing executed when an object that extends over a plurality of tiles is divided into tiles will be described below with reference to FIG. 11.

Figure 11:
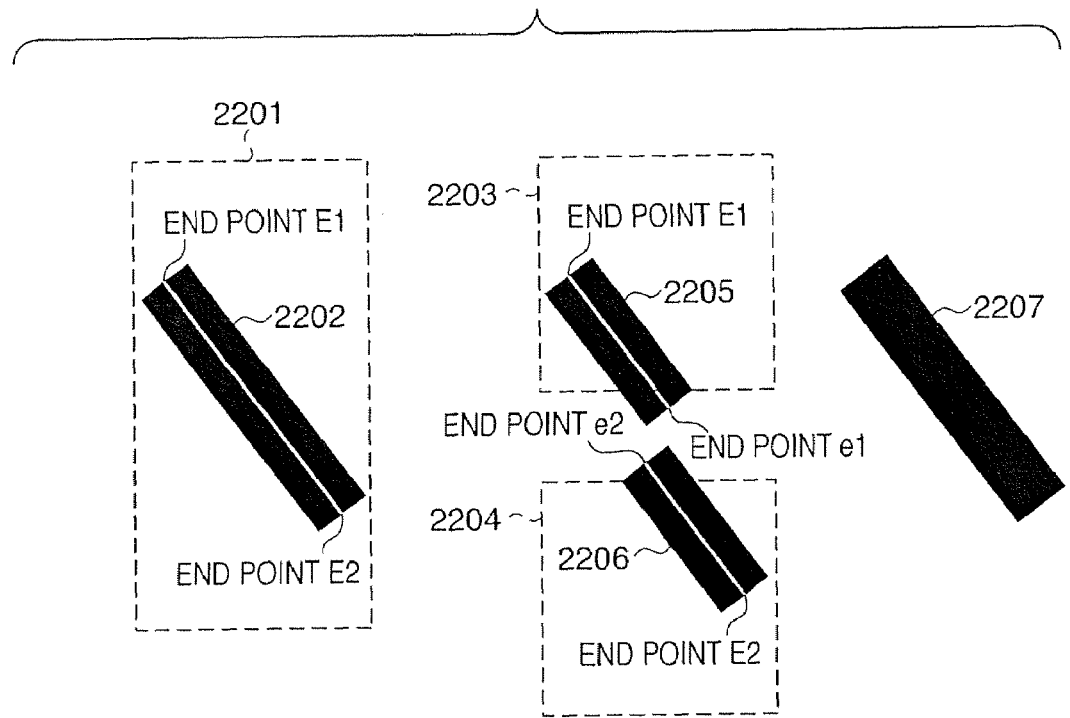
FIG. 11 is a diagram showing an example of division processing of a line object according to the first embodiment of the present invention.

FIG. 11 is a diagram showing an example of division processing of a line object according to the first embodiment of the present invention.

Referring to FIG. 11, reference numeral 2201 denotes a part of page vector data, that is, a diagram based on an actually rasterized image. In this example, the page vector data 2201 has object data 2202 of a line segment. The object data 2202 of the line segment is expressed by vector data that connects start point coordinates (x1, y1) representing an end point E1, and terminal point coordinates (X1, Y1) representing an edge E2 as control point coordinates thereof, and has a line width. Also, the object data 2202 has a line width=28 pt as an attribute value. These control point coordinates and attribute values can be recognized as object information associated with the object data.

Assume that this page vector data 2201 is divided into tile vector data 2203 and 2204. In this case, the object data 2202 is divided into object data 2205 and 2206, and new end points e1 and e2 are generated. These end points e1 and e2 are expanded to assume coordinate values outside the corresponding tile regions, and their coordinates are re-set, so as to prevent any omissions after rasterization. For example, each end point may be re-set at a position separated by the line width in a direction perpendicular from the tile boundary.

More specifically, coordinate information of the object data 2205 is expressed by a start point (a1, b1)→a terminal point (A1, B1). Coordinate information of the object data 2206 is expressed by a start point (a2, b2)→a terminal point (A2, B2)

The object data 2205 and 2206 obtained in this way are respectively held in the tile vector data 2203 and 2204. The tile vector data 2203 and 2204 are independently rasterized. Even in such case, since the end points e1 and e2 are re-set, a desired result 2207 after rasterization can be obtained without causing omissions of an image, as shown in FIG. 11.

In the example of FIG. 11, the two pieces of coordinate information of both the end points e1 and e2 are re-set. However, depending on the types and positions of object data to be divided, at least one of these points may be re-set.

(Step S606)

The tile/page vector converter 13 converts the coordinate position so as to change the command description of the input object to the rendering position in the tile vector data. The page vector data describes a position from the upper left corner of a page, while a position from the upper left corner of a tile is re-described for each tile vector data. By describing the rendering position as coordinates in a tile, a data length required for coordinate calculations can be shortened. Also, depending on the object type (e.g., a line segment object), the converter 13 executes attribute value conversion (coordinate information) at the same time.

(Step S607)

Upon completion of the command description conversion for one object, the tile/page vector converter 13 checks if the command description conversions for all the objects in a page are complete. If all the command description conversions are not complete yet (NO in step S607), the process returns to step S603 to repeat the processes in steps S603 to S607 for the next command sequence. On the other hand, if all the command description conversions are complete (YES in step S607), the process advances to step S608.

(Step S608)

Upon completion of all the command description conversions, the tile/page vector converter 13 writes out the converted commands into the system memory 5 sequentially from the upper left corner of the page as tile vector data for respective tiles in the tile vector data divided, as shown in FIG. 8. The tile vector data is described in a format by appending commands indicating the start and end of a tile to those described in steps S605 and S606.

At the write-out timing of the first command sequence of a page, tile vector data including no object is generated in the system memory 5. The tile vector data including no object corresponds to, for example, tile A in FIG. 8. This tile A is described by the rendering instruction part 1103 (FIG. 9) including only the commands C7 and C8 indicating the start and end of the tile.

The tile/page vector converter 13 appends the descriptions of the object to tiles at coordinates where the commands processed in steps S603 to S607 exist. For example, tile B in FIG. 8 is described by the rendering instruction part 1104 (FIG. 9) including the commands C9 to C15. Also, when there are a plurality of objects on a single tile like tile D, the object description which configures the text rendering instruction part 1107 and that which configures the graphic rendering instruction part 1108 are recited.

(Step S609)

Upon completion of the write-out processing of one object to tile vector data, the tile/page vector converter 13 checks if all the object descriptions of that page are complete. If all the object descriptions of that page are not complete yet (NO in step S609), the process returns to step S603. On the other hand, if all the object descriptions of that page are complete (YES in step S609), the processing ends.

On the other hand, a case will be explained below wherein the type of document data is tile vector data in step S602.

(Step S610)

The tile/page vector converter 13 loads a command sequence that describes an object from tile vector data.

(Step S611)

The tile/page vector converter 13 analyzes the command sequence loaded in step S610 to check if the described object can be combined to the tiles loaded so far. If the object cannot be combined (NO in step S611), the process skips step S612 and advances to step S613. On the other hand, if the object can be combined (YES in step S611), the process advances to step S612.

Whether or not the object can be combined is determined based on the coordinate positions, graphic type, and the like of the loaded commands. In case of a character string, determination is made based on the font size and type.

(Step S612)

The tile/page vector converter 13 executes the object combining processing. This processing is implemented by reversing the processing sequence in step S605.

(Step S613)

The tile/page vector converter 13 converts the coordinate position so as to change the command description of the input object to the rendering position in the page vector data. Each tile vector data describes a position from the upper left corner of a tile, but a position from the upper left corner of a page is re-described for the page vector data. Also, depending on the object type, the converter 13 executes attribute value conversion.

(Step S614)

Upon completion of the command description conversion for one object, the tile/page vector converter 13 checks if the command description conversions for all the objects in a tile are complete. If all the command description conversions are not complete yet (NO in step S614), the process returns to step S610 to repeat the processes in steps S603 to S607 for the next command sequence. On the other hand, if all the command description conversions are complete (YES in step S614), the process advances to step S615.

(Step S615)

Upon completion of all the command description conversions, the tile/page vector converter 13 writes out the converted commands onto the system memory 5 as page vector data. The page vector data is described in a format by deleting commands indicating the start and end of a tile from those described in steps S612 and S613.

At the write-out timing of the commands described in the first tile in a page, page vector data including no object is generated in the system memory 5. Such page vector data will be described using the description of FIG. 7. That is, the page vector data including no object is that described by only the commands C1 to C6 and command C22.

Next, the tile/page vector converter 13 appends the description of the object processed in steps S610 to S613. In case of the description of FIG. 7, such description corresponds to the commands C7 to C11 which constitute the text rendering instruction part 902. The object in this case indicates a character string {XXXX . . . YY . . . }, which corresponds to the description of the object obtained by sequentially combining the character strings in respective tiles described by the text rendering instruction parts 1104, 1107, and the like in FIG. 9 in step S612.

(Step S616)

Upon completion of the write-out processing of one command sequence to page vector data, the tile/page vector converter 13 checks if all the object descriptions of that tile are complete. If all the object descriptions are not complete yet (NO in step S616), the process returns to step S610. On the other hand, if all the object descriptions are complete (YES in step S616), the process advances to step S617.

(Step S617)

Upon completion of the write-out processing of one tile vector data, the tile/page vector converter 13 checks if processing for all the descriptions of tile vector data of that page is complete. If the processing is not complete yet (NO in step S617), the process returns to step S610. On the other hand, if the processing is complete (YES in step S617), the processing ends.

[Image Data Rasterizer (RIP)]

Details of the RIP 18 in the controller 1 will be described below.

Before the beginning of processing such as copy, print, send, and the like for image data, the local memory 19 is initialized, and the resolution of an object to be generated is set. In the first embodiment, the generation resolution is 600 dpi, and the point size and a print command designated using a unit system of, for example, mm are converted into the number of dots using this value.

The processing when the RIP 18 executes tile vector data rasterization will be described below with reference to FIG. 12.

Figure 12:
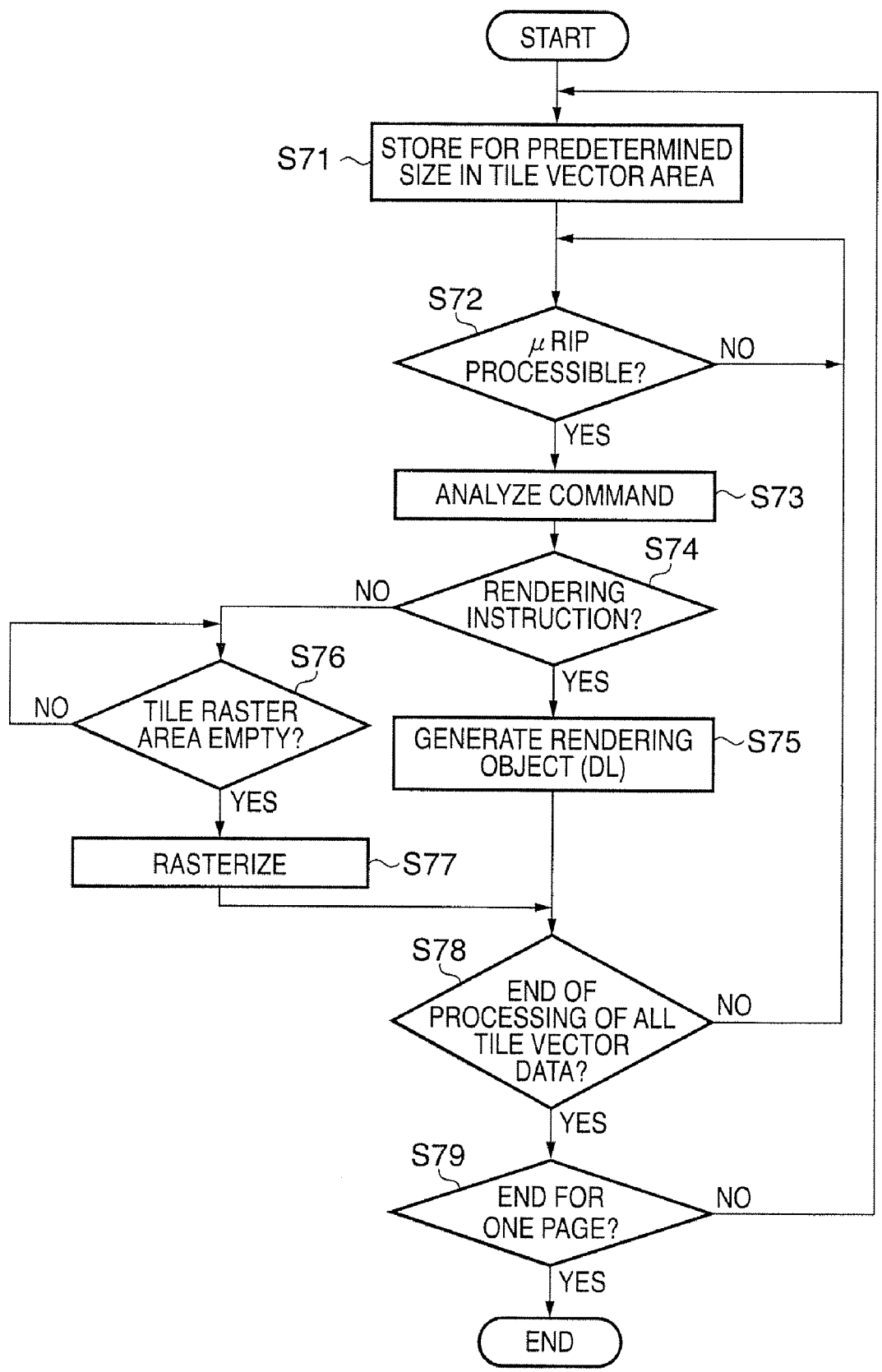
FIG. 12 is a flowchart showing processing to be executed by an RIP according to the first embodiment of the present invention.

FIG. 12 is a flowchart showing processing to be executed by the RIP according to the first embodiment of the present invention.

(Step S71)

Tile vector data for a predetermined size input from the system memory 5 to the RIP 18 via the SBB 2 are temporarily stored in a tile vector area of the local memory 19.

(Step S72)

After the tile vector data are stored in the local memory 19, the RIP 18 checks if any of the μRIPs 18*a* to 18*d* included in itself can rasterize (process) tile vector data. If all the μRIPs 18*a* to 18*d* are rasterizing (processing) tile vector data (NO in step S72), the control waits until any of these μRIPs becomes ready to rasterize.

(Step S73)

If any of the μRIPs 18*a* to 18*d* becomes ready to rasterize tile vector data, the μRIP executes command analysis of the tile vector data stored in the local memory 19 according to a predetermined grammar.

(Step S74)

The μRIP checks if the command of interest is a rendering instruction or a discharge instruction. If the command of interest is a rendering instruction (YES in step S74), the process advances to step S75. On the other hand, if the command of interest is a discharge instruction (NO in step S74), the process advances to step S76.

(Step S75)

If the command of interest is a rendering instruction, the μRIP executes generation of a rendering object (DL data). If the command of interest in the tile vector data is a text rendering instruction, the μRIP generates a font object based on the font face, character size, and character code designated by that command, and stores the generated font object in a DL data area of the local memory 19. On the other hand, if the command of interest is a rendering instruction other than text, that is, a graphic rendering instruction, the μRIP generates a rendering object of a graphic (line, circle, polygon, or the like) designated by that command, and stores the generated rendering object in the DL data area of the local memory 19.

If the command of interest is print data which is not designated by a rendering instruction, the μRIP executes print control processing such as print position shift, print environment settings, and the like according to this print data, thus ending command analysis for one unit.

The μRIP repeats the above processing until analysis of all the commands in the tile vector data is complete.

(Step S76)

If the command of interest is a discharge instruction, the μRIP checks if a tile raster area on the local memory 19 includes a free area. If the tile raster area does not include any free area (NO in step S76), that μRIP waits until other μRIPs complete their processes, and releases the tile raster area to form a free area. On the other hand, if the tile raster area includes a free area (YES in step S76), the process advances to step S77.

(Step S77)

If the tile raster area includes a free area, the μRIP reads out the rendering object generated in step S75, and renders (rasterizes) it on the tile raster area. At this time, if the generation resolution is 600 dpi, the object is rasterized on the tile raster area as an image of 600 dpi, The μRIP outputs the rendered tile raster image to the image processor 15 via the SBB 2.

(Step S78)

Upon completion of command analysis or rendering processing for one tile vector data in step S75 or S77, the μRIP checks if processing for all the tile vector data stored in the tile vector area is complete. If tile vector data to be processed still remain (NO in step S78), the process returns to step S72 to continue the processing for the next tile vector data. On the other hand, if tile vector data to be processed does not remain (YES in step S78), the process advances to step S79.

(Step S79)

The RIP 18 checks if all the processes are complete for tile vector data for one page. If tile vector data to be processed still remain (NO in step S79), the process returns to step S71 to read out tile vector data from the system memory 5 and to continue the processing. On the other hand, if tile vector data to be processed does not remain (YES in step S79), the processing ends.

As described above, according to the first embodiment, page vector data is divided into block (tile) vector data while maintaining continuity of an object, so as to avoid any omissions of the object in rasterize processing of the divided block vector data.

More specifically, when object data to be divided is line segment object data, the end points (initial and terminal points) which specify that line segment object data are re-set for each divided line segment object data independently of interior/exterior of each block region.

In this way, the rasterize processing of each line segment object data which belongs to a block can reclaim a line segment object before division without causing any omissions of the object which may occur at the time of division.

Upon dividing page vector data into block vector data, since block vector data can be generated while inheriting the form of a vector object that the data holds, the page vector data can be easily reconstructed.

Second Embodiment

The second embodiment will explain a case in which an object to be processed is a broken line object in object division in step S605 in FIG. 10.

FIG. 13 is a diagram showing an example of the division processing of a broken line object according to the second embodiment of the present invention.

Referring to FIG. 13, reference numeral 2301 denotes a part of page vector data, i.e., a diagram based on an actually rasterized image. In this example, the page vector data 2301 has object data 2302 of a broken line. The object data 2302 of the broken line is expressed by vector data that connects start point coordinates (x1, y1) and terminal point coordinates (X1, Y1) as its control point coordinates. The object data 2302 has, as attribute values, information required to form a broken line, offset information of positions where line segments start, and information of the length of each line segment, that of each space, and the like.

Assume that the page vector data 2301 is divided into tile vector data 2303 and 2304. In this case, the object data 2302 is divided into object data 2305 and 2306. At this time, in the object data 2306, the offset value as one of the attribute values is rewritten from 0 to 1 so that the start point of each line segment in the broken line is set to have a desired value. The object data 2305 and 2306 obtained in this way are respectively held in the tile vector data 2303 and 2304.

The tile vector data 2303 and 2304 are independently rasterized. In this case as well, the attribute values of the broken line object are re-set. In this way, raster data 2307 as the result after rasterization can obtain a desired result without any omissions of a partial image of the object data 2303, as shown in FIG. 13.

As described above, according to the second embodiment, the effects described in the first embodiment can also be obtained for the broken line object. Especially, in case of the broken line object, the offset information of the position where each line segment starts is re-set. In this way, the rasterize processing of each broken line object data that belongs to a block can reclaim the broken line object before division without causing any omissions of the object which may occur upon division.

Third Embodiment

The third embodiment will explain a case in which an object to be processed is a gradation object in object division in step S605 in FIG. 10.

FIG. 14 is a diagram showing an example of the division processing of a graphic object according to the second embodiment of the present invention.

Referring to FIG. 14, reference numeral 2401 denotes a part of page vector data, i.e., a diagram based on an actually rasterized image. In this example, the page vector data 2401 has object data (gradation object data) added with gradation. The object data has start point coordinates and terminal point coordinates, and information of a color space required to express colors, and a start point color and terminal point color as attribute information. The object data expresses a change in predetermined color value from the start point to the terminal point by these pieces of information.

Note that this page vector data 2401 expresses gradation by changing a change in color from the start point color=white (0xffffff) to the terminal point color=red (0xff7f7f) in the lower left 45° direction.

Assume that the page vector data 2401 is divided into tile vector data 2402 and 2403. In this case, the tile vector data 2402 as gradation object data sets the upper right and lower left corners of a tile as the initial and terminal point coordinate values as its control point coordinates, and sets 0xffffff and 0xffa9a9 as the initial and terminal point colors. The tile vector data 2403 as the other divided gradation object data sets the upper right and lower left corners of a tile as the initial and terminal point coordinate values as its control point coordinates, and sets 0xffd4d4 and 0xff7f7f and 0xffa9a9 as the initial and terminal point colors. The tile vector data 2402 and 2403 as the gradation object data obtained in this way are held as individual tile vector data.

These tile vector data are independently rasterized. The result after rasterize processing is obtained as a series of gradation.

As described above, according to the third embodiment, the effects described in the first embodiment can also be obtained for the gradation object. Especially, in case of the gradation object, the initial and terminal point coordinate values where gradation starts are re-set. In this way, the rasterize processing of each gradation object data that belongs to a block can reclaim the gradation object before division without causing any omissions of the object which may occur upon division.

Fourth Embodiment

Figure 15:
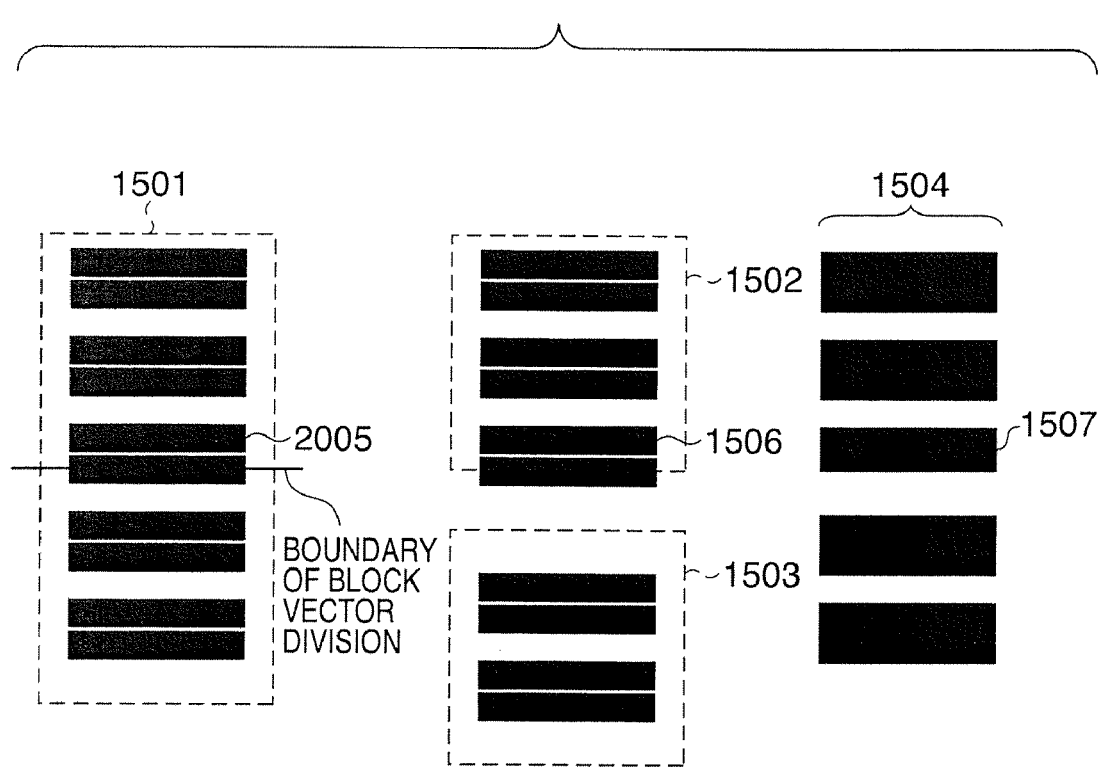
FIG. 15 is a view for explaining a problem of object division processing.

Another problem of a line segment object will be described below with reference to FIG. 15.

Reference numeral 1501 denotes a part of page vector data, i.e., a diagram based on an actually rasterized image. This example illustrates data in which five object data of line segments each having a line width are arranged. Upon dividing the page vector data 1501 into block vector data 1502 and 1503, a line object 1506 exists in the neighborhood of the boundary between the two block vector data 1502 and 1503.

This line object 1506 shows an example in which the coordinate positions of its initial and terminal points fall within the region of the block vector data, but a part of the object exceeds the boundary of the block vector data when line width attribute data is applied to the object.

In this case, the line width information of the line object is not reflected in the block vector data 1503. For this reason, upon independently rasterizing the block vector data 1502 and 1503, raster data 1504 consequently includes raster data 1507 corresponding to the line object 1506 whose line width is partially omitted.

The object division processing in such case will be described below with reference to FIG. 16.

Figure 16:
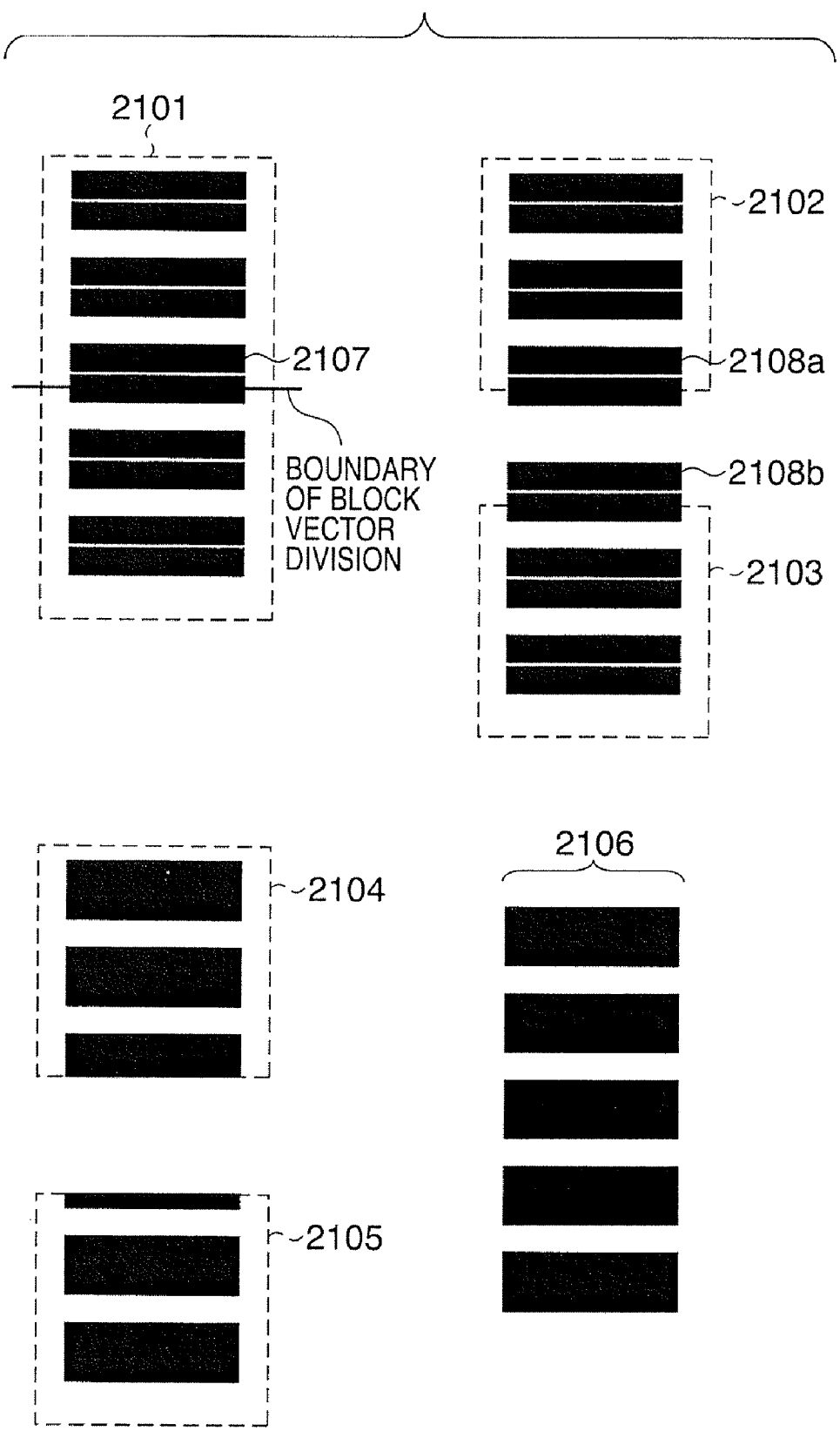
FIG. 16 is a diagram showing an example of division processing of line objects according to the fourth embodiment of the present invention.

FIG. 16 is a diagram showing an example of division processing of line objects according to the fourth embodiment of the present invention.

Referring to FIG. 16, reference numeral 2101 denotes a part of page vector data, i.e., a diagram based on an actually rasterized image. This example illustrates data in which five line objects are arranged. Each line object includes coordinate information of initial and terminal points as its control point coordinates, or attribute information indicating a line attribute.

For example, this line object holds the following information.

Coordinate information: start point (x1, y1)→terminal point (X1, Y1)
Pattern: solid line
Color: black
Line width: 28 pt Paying attention to a line object 2107, the coordinate values of the initial and terminal points of this line object 2107 fall within the region of upper tile vector data when the page vector data is divided into tile vector data. However, when the line width is applied to the line object, rendering is required for the region of lower tile vector data as an image after rasterization. As a conditional formula at this time, in case of the line object, the length ½ of the line width in the x- and y-directions is added in the positive direction or is subtracted in the negative direction to or from the coordinate value of the object, and it is checked if the coordinate value falls within the region of a tile.

That is, the fourth embodiment analyzes the attribute information of the object included in the vector data. Also, the positional relationship with the boundaries of block vector data to be divided is calculated based on the coordinate information of the object. Next, it is checked based on the analysis result and the calculated positional relationship whether or not the object itself can be rendered within one block vector data but the object need be rendered to extend over the boundary of the block vector data upon applying the attribute information of that object. If the object need be rendered to extend over the boundary, the object in the block vector data is reconfigured so as to also render that object in the neighboring block vector data.

In case of FIG. 16, the following processing is done. Upon dividing the page vector data 2101 into a plurality of tile vector data 2102 and 2103, vector data of the line object of interest are configured to be doubly held by the upper and lower tile vector data 2102 and 2103, as denoted by reference numerals 2108a and 2108b. The tile vector data 2102 and 2103 are independently rasterized. Reference numerals 2104 and 2105 denote rasterized images at that time. In the image 2105, a part of the line object to which the line width is applied is rendered. As a result, raster data 2106 is obtained as the final output, i.e., a desired result, unlike the raster data 1504 that causes an image omission, as shown in FIG. 15.

In this way, when the object extends over a plurality of tile vector data after application of its attribute value, the object is doubly held by independent tile vector data. However, a plurality of tile vector data must hold an identical object with increasing number of tile vector data over which the object extends, thus causing an overhead.

Hence, in such case, whether a plurality of objects are generated or the object is divided into tile vector data as a plurality of outline vector data and the divided tile vector data are held may be selected depending on the number of tile vector data over which the object extends.

This example has explained the line object. The same processing applies to a curve object. In this case, upon dividing into tiles, the conditional formula required to doubly hold the object may be modified according to the object.

As described above, according to the fourth embodiment, page vector data is divided into block (tile) vector data while maintaining continuity of an object, so as to avoid any omissions of the object in rasterize processing of the divided block vector data.

More specifically, when an object extends over a plurality of tile vector data after application of its attribute value, that object is doubly held by independent tile vector data. In this way, the rasterize processing of each line object data that belongs to a block can reclaim the line object before division without causing any omissions of the object which may occur upon division.

Fifth Embodiment

Another object division processing will be described below with reference to FIG. 17.

FIG. 17 is a diagram showing an example of object division processing according to the fifth embodiment of the present invention.

In the example shown in FIG. 17, coordinate data itself of an object does not extend over the boundary between a plurality of tiles, but that object extends over the tile boundary after an attribute value is applied to the object in some cases. The object division processing in such case will be described below.

Referring to FIG. 17, reference numerals 12201 and 12202 denote tile boundaries upon dividing page vector data into tile vector data. Note that object data 12203 represents an object formed by combining two lines, and applying interpolation processing to the combined part. This object includes coordinate information of initial and terminal points as its control point coordinates, or attribute information indicating a line attribute.

For example, this object holds the following information.

Coordinate information: start point (x1, y1)→(x2, y2)→terminal point (X1, Y1)
Pattern: solid line
Color: black
Line width: 28 pt
Interpolation method: round join Note that "round join" of the interpolation method is to combine lines to have a smooth, round combined part. In this example, since the object data 12203 entirely falls within the tile vector data 12201, the tile vector data 12202 does not include any object.

Processing for a similar object having the following attributes will be explained below.

Coordinate information: start point (x1, y1)→(x2, y2)→terminal point (X1, Y1)
Pattern: solid line
Color: black
Line width: 28 pt
Interpolation method: miter join Note that "miter join" of the interpolation method is to combine lines to have a sharp combined part. In this example, object data 12206 need be rendered not only in the region of tile vector data 12204 but also in that of neighboring tile vector data 12205 as a result of application of the interpolation method of the combined part. In such case, the tile vector data 12205 is configured to hold information of the object data 12206. Even when the tile vector data 12204 and 12205 are independently rasterized, a desired result can be obtained as well as the interpolation processing of the combined part.

As described above, according to the fifth embodiment, the data interpolation method in the rasterize processing is set as an attribute value upon execution of the object division processing. In this way, even when coordinate data itself of an object does not extend over the boundary between a plurality of tiles, but that object extends over the tile boundary after an attribute value is applied to the object, a normal object before division can be limited.

Sixth Embodiment

Figure 20:
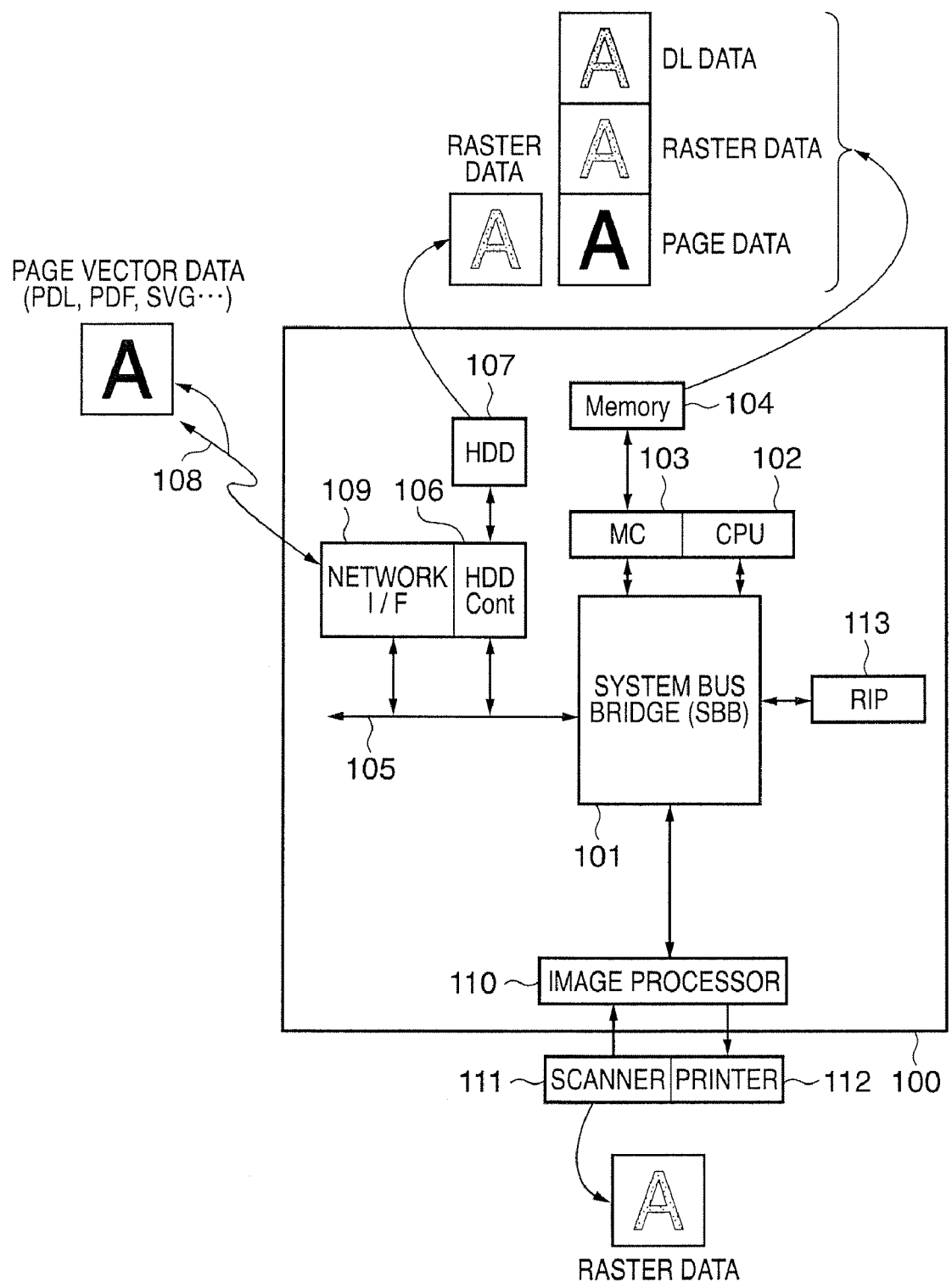
FIG. 20 is a block diagram showing the arrangement of a conventional image processing system.
Figure 21:
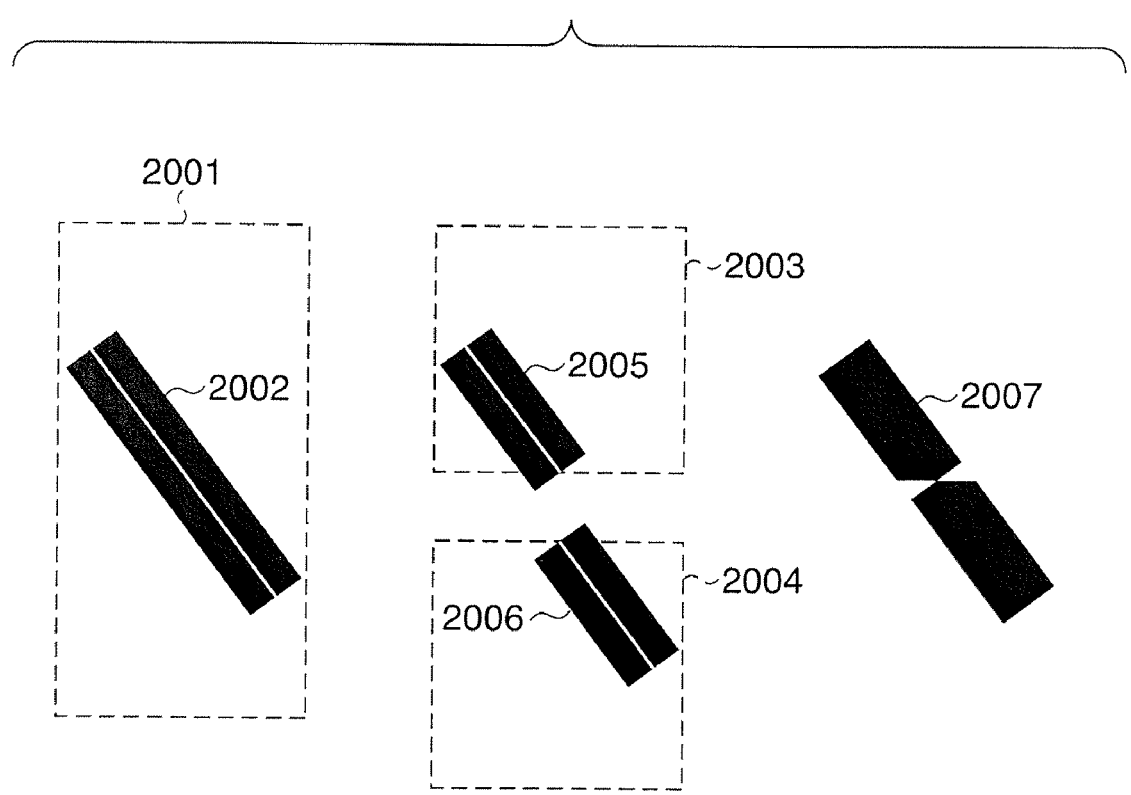
FIG. 21 is a view for explaining a problem of object division processing.
Figure 22:
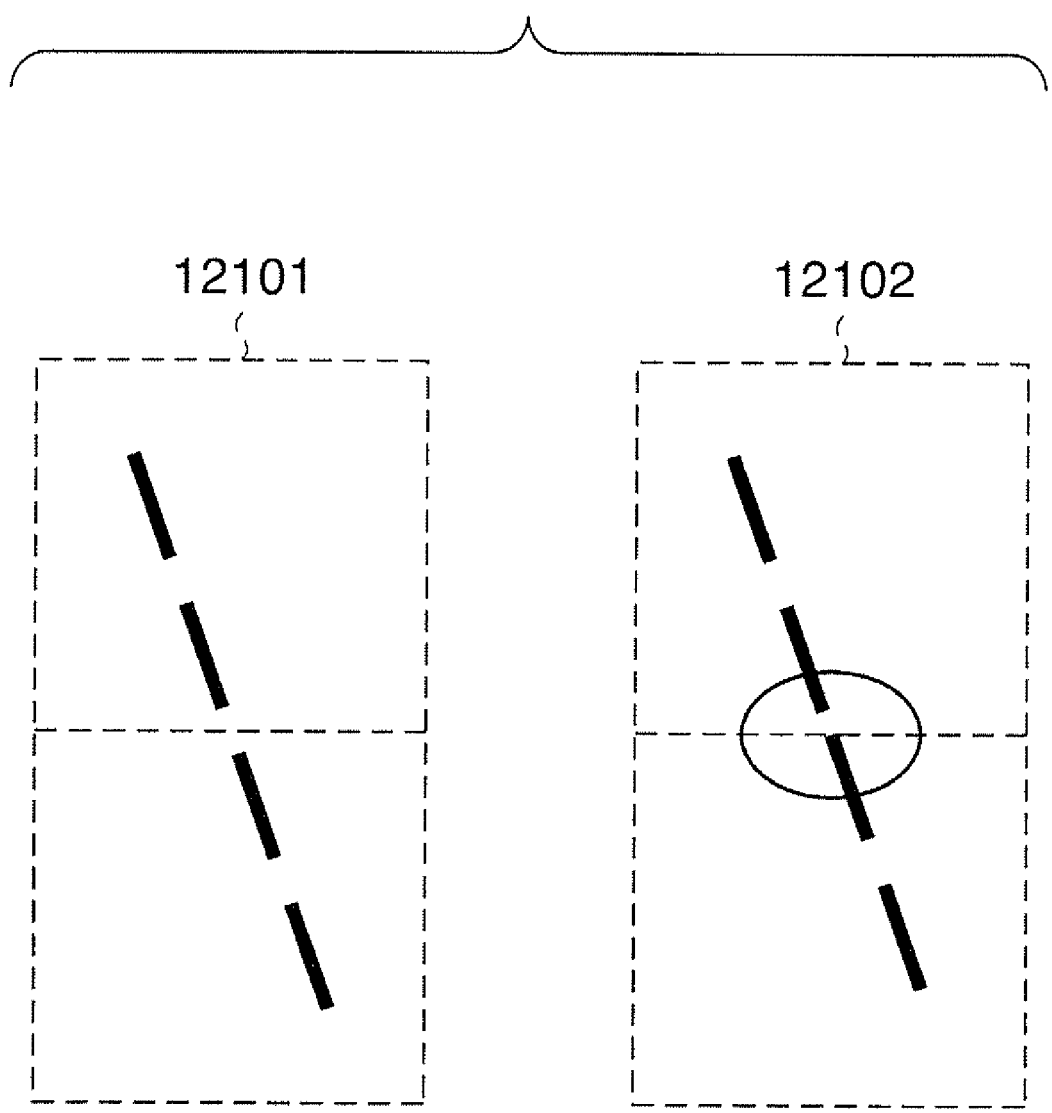
FIG. 22 is a view for explaining a problem of object division processing.

When an original object is divided into blocks, and blocks are rasterized to bitmap images, i.e., when divided blocks are respectively independently rasterized, the following phenomenon may occur. That is, respective blocks include many end points generated by division in addition to original end points of the object. For this reason, when an RIP 113 (FIG. 20) rasterizes that object, it may execute the same end point processing as that for the original end points to the end points generated by division.

In general, this end point processing is relatively heavy and requires a long processing time in the rasterize processing of line and curve objects. Therefore, when a processing region is divided into blocks such as bands, tiles, or the like, each of which is smaller than a page, wasteful end point processing for end points generated by division takes place frequently, thus prolonging the time required for the rasterize processing of the object.

In the sixth embodiment, object division processing when line and curve objects which extend over a plurality of tiles are divided into tiles will be described below with reference to FIGS. 18 and 19 as an example of object division processing that reduces such load of the end point processing.

FIG. 18 is a diagram showing an example of conventional division processing of line and curve objects. FIG. 19 is a diagram showing an example of division processing of line and curve objects according to the sixth embodiment of the present invention.

FIGS. 18 and 19 show object division processing when one line object extends over three tile vector data, i.e., tiles T1, T2, and T3. Assume that the line object has coordinates of two end points, i.e., end points E1 and E2 as control point coordinates, and also has at least the following items as attribute information.

Coordinate information (outline): start point (x1, y1)→terminal point (X1, Y1)
Pattern: solid line
Color: black
Line width: 42 pt
End point: round cap In the prior art shown in FIG. 18, the control point coordinates are converted into new control point coordinates with reference to the position coordinates for respective tile vector data before and after object division, but the attribute information is inherited intact from the object before division.

On the other hand, in the configuration of the sixth embodiment shown in FIG. 19, the control point coordinates are converted into position coordinates for respective tiles before and after object division. However, the attribute information is inherited from the object before division, and an end point processing unnecessary flag used to distinguish from original end points of the object before division is assigned to end points generated by division.

That is, with this configuration, by detecting if the value of the end point processing unnecessary flag of each end point is "0" or "1", whether the end point of interest is the original end point E1 or E2 or the end point e1, e2, e3, or e4 generated by division can be easily distinguished.

Note that the end point processing unnecessary flag indicates the presence/absence of execution of the end point processing required to render an end point in step S75 (generation of rendering object (DL) data) in FIG. 12. Especially, the end point processing is executed for the end point to be processed when the flag is "1", and it is not executed for the end point to be processed when the flag is "0".

Especially, the sixth embodiment sets "0" as the flag value of the end point processing unnecessary flag for the original end points of the object before division, and "1" as that for new end points generated by division. The flag value of the end point processing unnecessary flag is written in, e.g., the system memory 5.

When the end point processing unnecessary flag is assigned, the processing contents in step S75 in FIG. 12 is controlled according to its flag value.

More specifically, in step S75 if the graphic designated by the command to be processed is a line or curve, the μRIP detects if the flag value of the end point processing unnecessary flag assigned to it is "0" or "1".

If the flag value is "0", the μRIP executes a rendering instruction associated with the end point processing in a conventional manner, and generates a rendering object. On the other hand, if the flag value is "1", the μRIP generates a rendering object by skipping a rendering instruction associated with the end point processing. In the example shown in FIG. 19, since the original end points E1 and E2 have flag values "0", they are rendered in a conventional manner. However, since the end points e1, e2, e3, and e4 generated by division have flag values "1", a rendering object is generated by skipping the end point processing.

As described above, according to the sixth embodiment, even when line and curve objects divided into tiles parallelly undergo rasterize processing, wasteful end point processing for end points generated by tile division can be omitted, thus shortening the rendering processing time of the objects.

Seventh Embodiment

The configurations of the first to sixth embodiments can be arbitrarily combined according to use applications and purposes, and embodiments may be implemented by such combinations.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-156647 filed on Jun. 5, 2006, which is hereby incorporated by reference herein in its entirety.

What is claimed is:

1. An image processing apparatus for generating block vector image data, each block vector image data having a set block size from page vector image data, comprising:
   a division unit adapted to divide an object which extends over a plurality of blocks, the object being one of objects included in the page vector image data, based on a boundary between the blocks and object information associated with a rendering instruction of the object, into a plurality of objects set with object information so as to prevent any omissions when the block vector image data is rasterized; and
   a generation unit adapted to generate block vector image data for the respective blocks using the object divided by said division unit.

2. The apparatus according to claim 1, wherein said division unit, when the object which extends over the plurality of blocks is a line segment object, based on control point coordinates information included in object information of the line segment object and the boundary of the blocks, divides the object into a plurality of line segment objects reset with the control point coordinates information so as to prevent any omissions when the block vector image data is rasterized.

3. The apparatus according to claim 2, wherein said division unit, when the object which extends over the plurality of blocks is a line segment object, resets coordinates of end points being control point coordinate information of the line segment object after division at a position separated from the boundary of the blocks, so as to prevent any omissions when the block vector image data is rasterized.

4. The apparatus according to claim 1, wherein said division unit, when the object which extends over the plurality of blocks is a broken line object, resets offset information included in object information of the broken line object after division, so as to prevent any omissions when the block vector image data is rasterized.

5. The apparatus according to claim 1, where said division unit, when the object which extends over the plurality of blocks is a gradation object, resets information of start point color and end point color included in object information of the gradation object after division, so as to prevent any omissions when the block vector image data is rasterized.

6. The apparatus according to claim 1, further comprising a reconfiguration unit adapted to, when a line segment object included in the page vector image data can be rendered within one block based on control point coordinate information included in the object information of the line segment object but the line segment object needs to be rendered to extend over a plurality of blocks upon application of line width information included in the object information of the line segment object, reconfigure objects of the block vector image data so as to render the line segment object within respective blocks of the plurality of blocks.

7. The apparatus according to claim 2, wherein said line segment object is a line object or a curve object.

8. The apparatus according to claim 1, wherein when an object included in the page vector image data is a combination object combined by a plurality of objects, and the object can be rendered within one block based on control point coordinate information included in object information of the combination object but the combination object needs to be rendered to extend over a plurality of blocks upon application of an interpolation method of endpoints of objects included in the object information of the combination object, reconfiguring objects of the block vector image data so as to render the combination object within respective blocks of the plurality of blocks.

9. The apparatus according to claim 1, wherein said division unit resets a flag used to distinguish end points generated by division and original end points of the object before division to end points of the object after division as object information of the divided object.

10. The apparatus according to claim 1, further comprising:
   a storage unit adapted to store the block vector image data generated by said generation unit; and
   a rasterization unit adapted to rasterize the block vector image data stored in said storage unit to raster image data.

11. The apparatus according to claim 10, wherein said rasterization unit comprises a plurality of rasterization units, and executes a parallel processing for the block vector image data for the respective blocks by the plurality of rasterization units.

12. The apparatus according to claim 9, further comprising a rasterization unit adapted to rasterizing the block vector image data to raster image data,
   wherein said rasterization unit controls whether or not end point processing required to render end points of an object to be processed based on a flag value of a flag included in the object information is executed.

13. A method of controlling an image processing apparatus for generating block vector image data, each block vector image data having a set block size from page vector image data, comprising:
   a division step of dividing an object which extends over a plurality of blocks, the object being one of objects included in the page vector image data, based on a boundary between the blocks and object information associated with a rendering instruction of the object, into a plurality of objects set with object information so as to prevent any omissions when the block vector image data is rasterized; and
   a generation step of generating block vector image data for the respective blocks using the object divided in said division step.

14. A computer-readable medium storing computer-executable instructions, which when executed by a computer, cause the computer to generate block vector image data, each block vector image data having a set block size from page vector image data, by performing:
   a division step of dividing an object which extends over a plurality of blocks, the object being one of objects included in the page vector image data, based on a boundary between the blocks and object information associated with a rendering instruction of the object, into a plurality of objects set with object information so as to prevent any omissions when the block vector image data is rasterized; and
   a generation step of generating block vector image data for the respective blocks using the object divided in said division step.

* * * * *